United States Patent
Nakano et al.

(10) Patent No.: US 6,852,053 B2
(45) Date of Patent: Feb. 8, 2005

(54) DRIVETRAIN FOR A VEHICLE

(75) Inventors: Masaki Nakano, Yokohama (JP); Toshikazu Oshidari, Yokosuka (JP); Keyvan Kargar, Paris (FR); Joel Poupon, Paris (FR)

(73) Assignees: Nissan Motor Co., Ltd., Yokohama (JP); Renault SA (FR)

( * ) Notice: Subject to any disclaimer, the term of this patent is extended or adjusted under 35 U.S.C. 154(b) by 22 days.

(21) Appl. No.: 10/200,551

(22) Filed: Jul. 23, 2002

(65) Prior Publication Data

US 2003/0069104 A1 Apr. 10, 2003

(30) Foreign Application Priority Data

Jul. 23, 2001 (JP) ........................................ 2001-221222

(51) Int. Cl.[7] .............................. F16H 3/72; F16H 37/06
(52) U.S. Cl. ................................ 475/5; 475/8; 475/10; 180/65.2
(58) Field of Search ............................... 475/5, 4, 6, 8, 475/10; 180/65.2, 65.3

(56) References Cited

U.S. PATENT DOCUMENTS

| | | | |
|---|---|---|---|
| 1,515,321 A | 11/1924 | Ahlm et al. | |
| 3,861,484 A | 1/1975 | Joslin | |
| 5,558,589 A | 9/1996 | Schmidt | |
| 5,833,564 A * | 11/1998 | Harris | 475/149 |
| 5,904,631 A * | 5/1999 | Morisawa et al. | 475/5 |
| 5,931,757 A | 8/1999 | Schmidt | |
| 6,022,287 A | 2/2000 | Klemen et al. | |
| 6,049,152 A | 4/2000 | Nakano | |
| 6,053,833 A | 4/2000 | Masaki | |
| 6,090,005 A | 7/2000 | Schmidt et al. | |
| 6,114,784 A * | 9/2000 | Nakano | 310/59 |
| 6,340,847 B1 * | 1/2002 | Kawabata et al. | 290/40 C |
| 6,455,947 B1 * | 9/2002 | Lilley et al. | 290/40 C |
| 6,472,845 B2 * | 10/2002 | Minagawa et al. | 318/801 |
| 6,551,208 B1 * | 4/2003 | Holmes et al. | 475/5 |
| 6,558,283 B1 * | 5/2003 | Schnelle | 475/5 |
| 6,563,246 B1 * | 5/2003 | Kajiura et al. | 310/162 |

FOREIGN PATENT DOCUMENTS

| | | | |
|---|---|---|---|
| DE | 199 09 424 | 8/2000 | |
| EP | 1 092 583 | 4/2001 | |
| FR | 2790615 A1 * | 9/2000 | ......... H02K/16/00 |
| JP | 06323378 A * | 11/1994 | ............ F16H/3/54 |
| JP | 2001-142146 A | 5/2000 | |
| WO | WO 00 32433 | 6/2000 | |

OTHER PUBLICATIONS

U.S. publication 2003/0073534 A1 to Oshidari et al.*

* cited by examiner

*Primary Examiner*—Tisha D Lewis
(74) *Attorney, Agent, or Firm*—Foley & Lardner LLP

(57) ABSTRACT

A four-element, two-freedom-degree planetary gear mechanism is constructed by arraying four input/output elements of a sun gear S1, a ring gear R, a carrier C and a sun gear S2 in a alignment chart. One of the two elements R and C arrayed on the inner side is assigned to the input In from an engine whereas the other is assigned to the output Out to the drive shaft, and the two outer elements S1 and S2 are connected to motor-generators MGi and MGo, respectively. As a result, the torque for the motor-generators to bear can be made lower than the engine output, and the energy to pass through the motor-generators is made lower to improve the transmission efficiency of the drivetrain.

12 Claims, 28 Drawing Sheets

MGi    In    Out      MGo

FIG. 26A
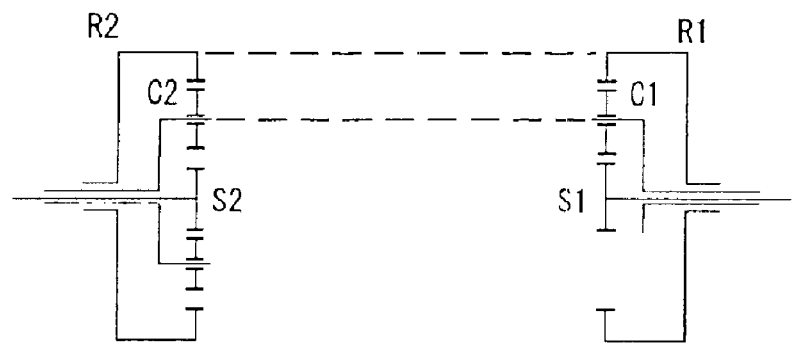
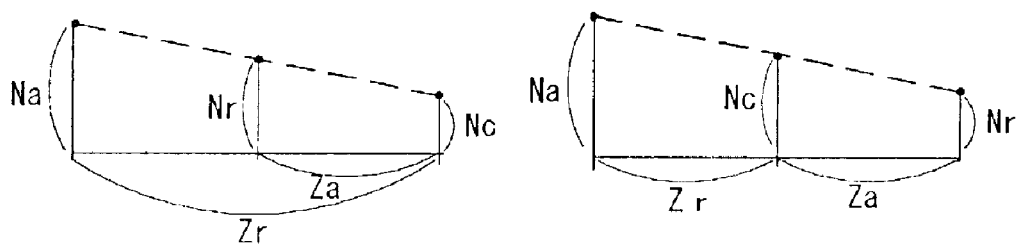
FIG. 26C        FIG. 26B
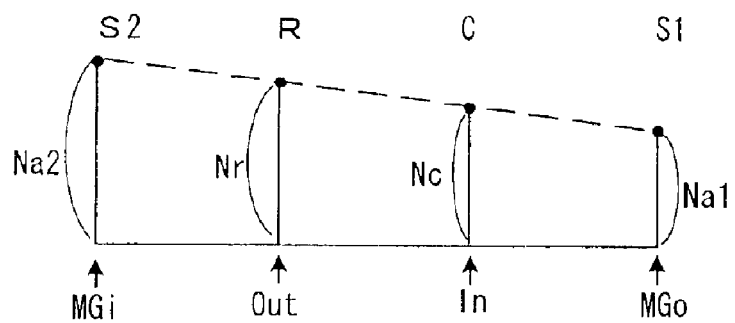
FIG. 26D

DRIVETRAIN FOR A VEHICLE

FIELD OF THE INVENTION

The present invention relates to a drivetrain for a hybrid vehicle including an engine and a motor and, more particularly, to a drivetrain which performs a continuously variable speed change by a differential mechanism such as a planetary gear mechanism.

BACKGROUND OF THE INVENTION

JP2000-142146A published by the Japanese Patent Office in 2000discloses a drivetrain for a hybrid vehicle which is constructed by connecting a generator, an engine and a motor for driving a vehicle to a sun gear, a planetary carrier and a ring gear of a planetary gear mechanism. According to this drivetrain, the continuously variable speed change and the increase or decrease of the output torque can be performed by using the differential function of the gears to distribute the engine output partially to the generator and supplying the generated electric power to the motor.

SUMMARY OF THE INVENTION

In the above drivetrain using the three-component planetary gear mechanism, a large generator and a motor are required since it is difficult to increase the energy passing through the planetary gears due to mechanical restrictions. If the energy passing through the generator and the motor is high, the transmission efficiency of the drivetrain decreases.

The electric energy generated by the generator is supplied through a converter and an inverter to the motor so that it is converted into mechanical energy. The energy transmission realized by the conversion between the electric energy and the mechanical energy displays considerably lower efficiency than a mechanical transmission by the gears or the like. In other words, the drivetrain displays lower transmission efficiency as the ratio of the energy passing through the generator and the motor increases.

It is therefore an object of this invention to improve the transmission efficiency of the drivetrain by distributing the motive power by a differential mechanism having at least four elements and to increase the energy mechanically transmitted from an engine to a drive shaft.

In order to achieve above object, this invention provides a drivetrain for transmitting driving force from an engine to a drive shaft of a vehicle, comprising a composite planetary gear mechanism including first to fourth rotational elements arrayed on an alignment chart, the first rotational element being connected to an output shaft of the engine and the second rotational element being connected to the drive shaft, a first motor-generator connected to the third rotational element, and a second motor-generator connected to the fourth rotational element, the second motor-generator being arranged coaxially with the first motor-generator.

The details as well as other features and advantages of this invention are set forth in the remainder of the specification and are shown in the accompanying drawings.

BRIEF DESCRIPTION OF THE DRAWINGS

FIGS. 26A–26D are explanatory diagrams for explaining the concept of the present invention.

DESCRIPTION OF THE PREFERRED EMBODIMENTS

Figure 1A:
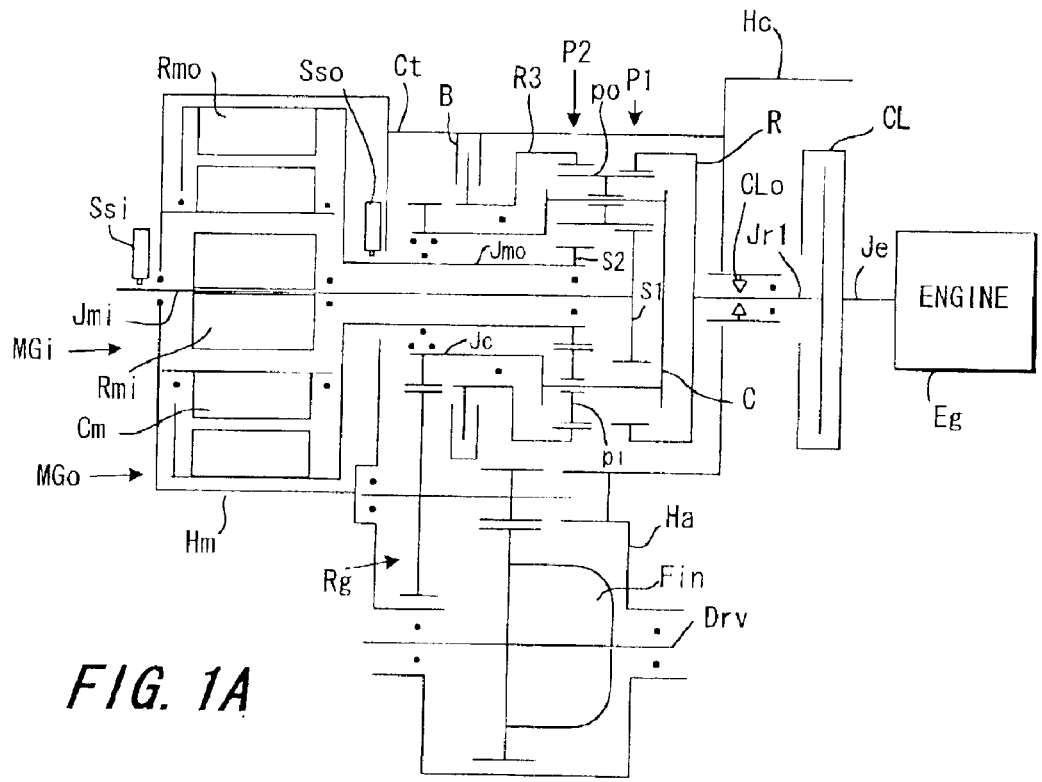
FIG. 1A is a schematic construction diagram of a first embodiment of the present invention and FIG. 1B is its alignment chart.
Figure 1B:
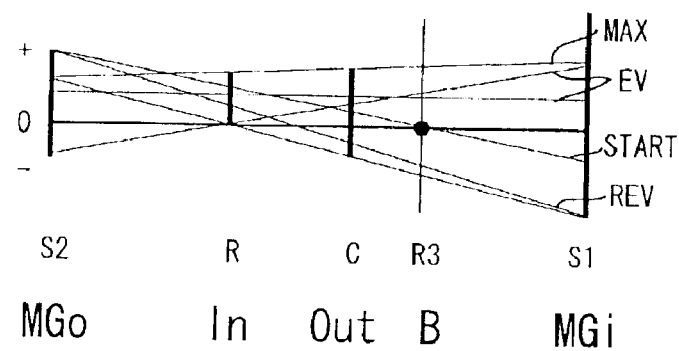

With reference to the accompanying drawings, embodiments in which the present invention is applied to a drivetrain for a front-wheel drive vehicle will be described. FIGS. 1A and 1B and succeeding figures show the schematic constructions and their alignment charts of different embodiments. Firstly, the embodiment of FIGS. 1A and 1B will be described in detail with respect to its construction, and the remaining embodiments will be described only with respect to points of difference. The common members among these embodiments will be designated by common reference numerals.

[FIGS. 1A and 1B: Embodiment 1]

In FIGS. 1A and 1B, reference letters Hm designate a motor housing, Ct a transmission casing, Hc a clutch housing, and Ha an axle housing. The clutch housing Hc is provided with a clutch CL for coupling or decoupling an output shaft Je of an engine Eg and a transmission input shaft Jr1. A single-pinion planetary gear train P1 and a double-pinion planetary gear train P2 are connected to share their ring gears R and carriers C (composite planetary gear mechanism) and are housed in the casing Ct. The input shaft Jr1, to which the clutch CL is connected, is the ring gear shaft of the planetary gear train P1. The input shaft Jr1 is equipped with a one-way clutch CLo for preventing the reverse rotation of the engine Eg. Here, in the reference numerals designating the components of the planetary gear trains P1 and P2, the suffix numeral 1 designates the components of the first planetary gear train P1, and the suffix numeral 2 designates the components of the second planetary gear train P2. Moreover, the planetary gear train P2 of the double pinion type is expressed (as in the following construction diagrams) in diagrams expanded conveniently in a section extending through the two pinion shafts.

In the motor housing Hm, there are coaxially supported an inner rotor Rmi and an annular outer rotor Rmo, by which compact electric machines are constructed to act as two motor-generators MGi and MGo. Between the inner and outer rotors Rmi and Rmo, there is interposed an annular coil Cm, by which the rotors Rmi and Rmo can be respectively actuated as a generator or motor. An inner rotor shaft Jmi is connected to a sun gear S1 of the planetary gear train P1 through a hollow outer rotor shaft Jmo, and the outer rotor shaft Jmo is connected to a sun gear S2 of the planetary gear train P2. Letters Ssi and Sso in FIG. 1A designate rotation speed sensors for detecting the rotation speeds of the inner rotor shaft Jmi and the outer rotor shaft Jmo respectively. Here, in the reference numerals designating the components of the motor-generators MGi and MGo, the suffix letter i designates the components of the first motor-generator MGi, and the suffix letter o designates the components of the second motor-generator MGo.

The axle housing Ha is connected to the side face of the transmission casing Ct. In the axle housing Ha, a final reduction mechanism Fin and a drive shaft Drv are supported in parallel with the planetary gear trains P1 and P2. The rotation of the carrier C is transmitted to the final reduction mechanism Fin through a reduction gear Rg. In this case, a carrier shaft Jc is an output shaft connected to the drive shaft Drv via the final reduction mechanism Fin.

A ring gear R3 which is supported coaxially with the ring gear R of the planetary gear train P1 meshes with inner pinions pi meshing with the sun gear S2 and outer pinions po of the planetary gear train P2. A brake B for braking the rotation of the ring gear R3 is mounted in the casing Ct.

In the alignment chart of FIG 1B, reference letters EV designate characteristics while running only by the motor-generators MGi and MGo, START characteristics at the starting time with the brake B being applied, MAX characteristics at the maximum vehicle speed, and REV characteristics while reverse running. Moreover, reference letters Out designate the output to the drive shaft Drv, and letters In designate the input from the engine Eg.

In this embodiment, by providing the clutch CL, the vehicle can be driven only by the motor-generators MGi and MGo by decoupling the engine Eg under the condition in which the engine Eg is frictional.

Moreover, since these two motor-generators MGi and MGo are coaxially arranged to enable more compact construction, the drivetrain can be downsized in order to improve its weight and mountability on the vehicle.

Further, since the ratio of the output rotation speed relative to the input rotation speed increases when the brake B is applied as illustrated in FIG. 1B, i.e., a large speed ratio can be obtained, the large torque can be generated, to improve the driving force and the starting performance from a stationary state.

Figure 2A:
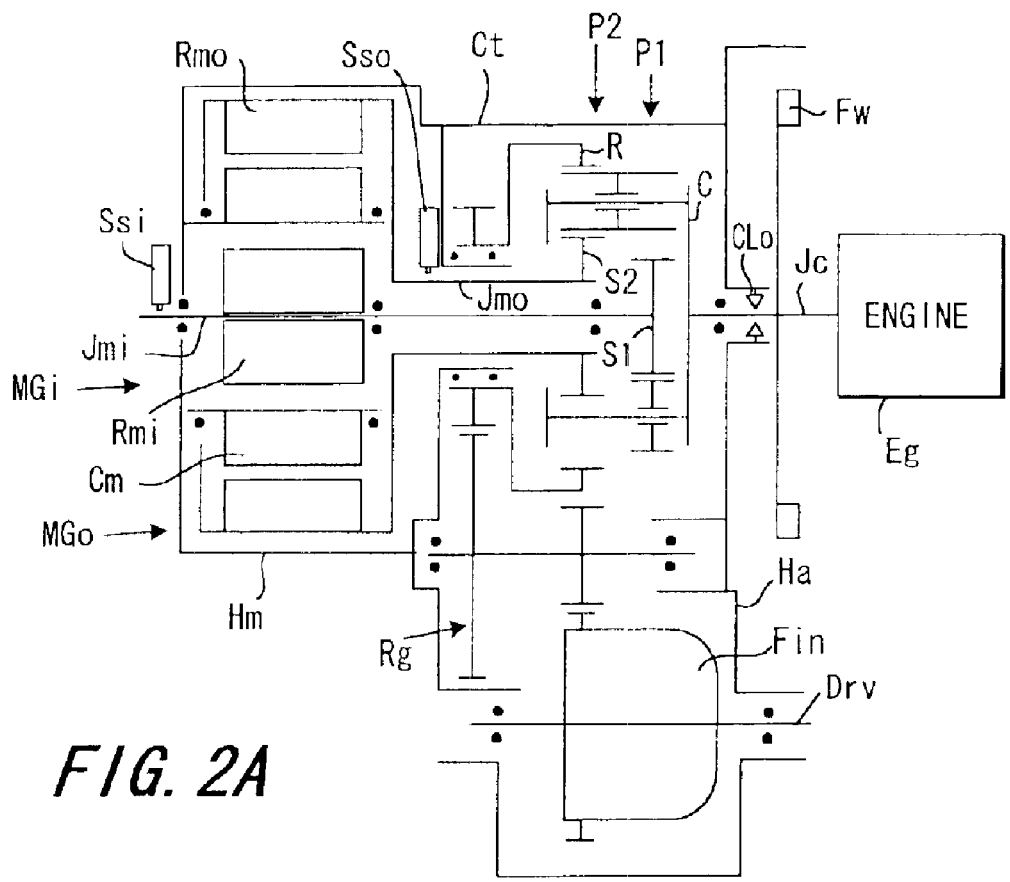
FIG. 2A is a schematic construction diagram of the second embodiment of the present invention and FIG. 2B is its alignment chart.
Figure 2B:
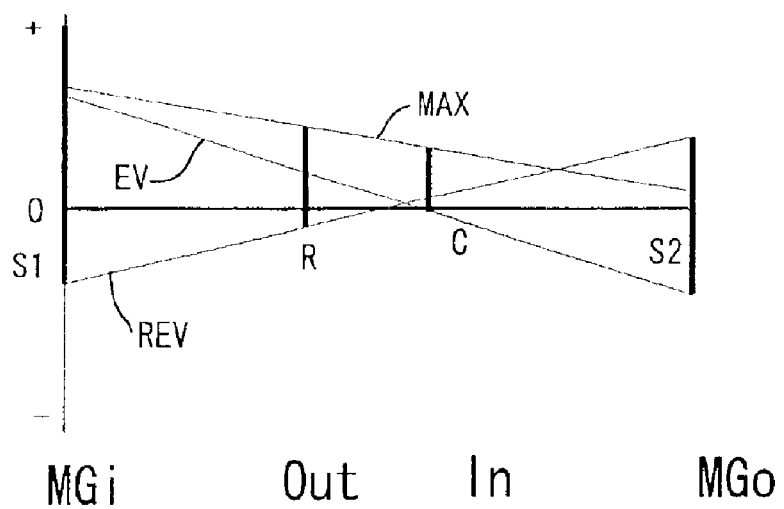

[FIGS. 2A and 2B: Embodiment 2]

The differences from the construction of FIGS. 1A reside in that the clutch CL and the brake B are omitted, in that the planetary gear train P1 having the sun gear S1 connected to the inner rotor shaft Jmi is a double-pinion type whereas the planetary gear train P2 having the sun gear S2 connected to the outer rotor shaft Jmo is a single-pinion type, in that the carrier shaft Jc is the input shaft connected to the engine Eg, and in that the ring gear R is connected to the final reduction mechanism Fin through the reduction gear Rg. Here, letters Fw in FIG. 2A designate a flywheel of the engine Eg.

Figure 3A:
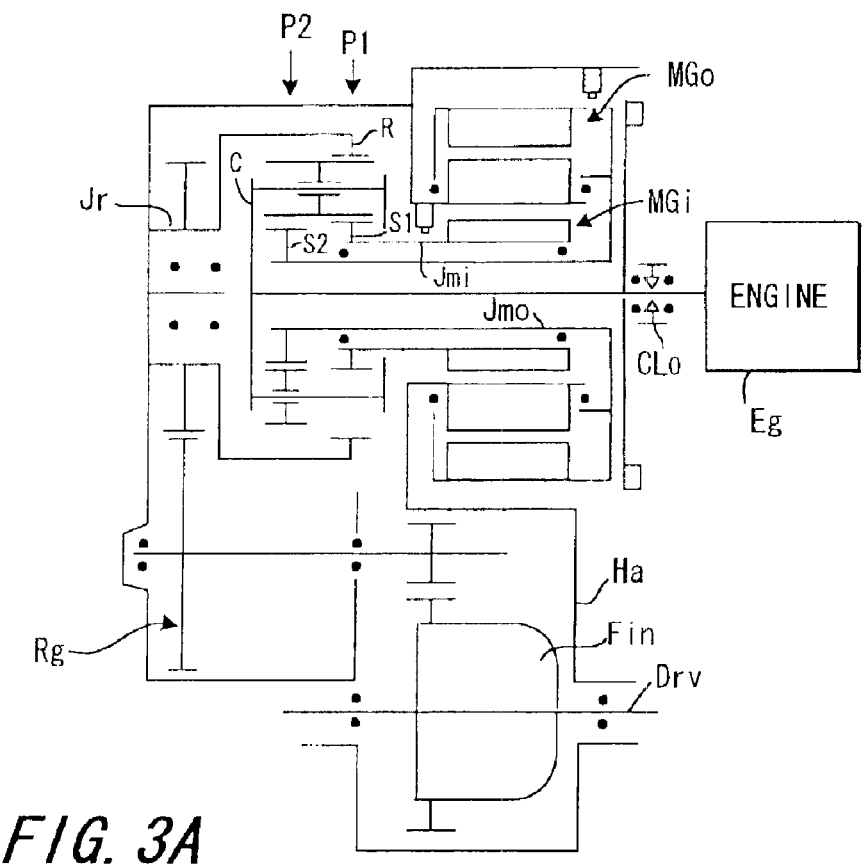
FIG. 3A is a schematic construction diagram of the third embodiment of the present invention and FIG. 3B is its alignment chart.
Figure 3B:
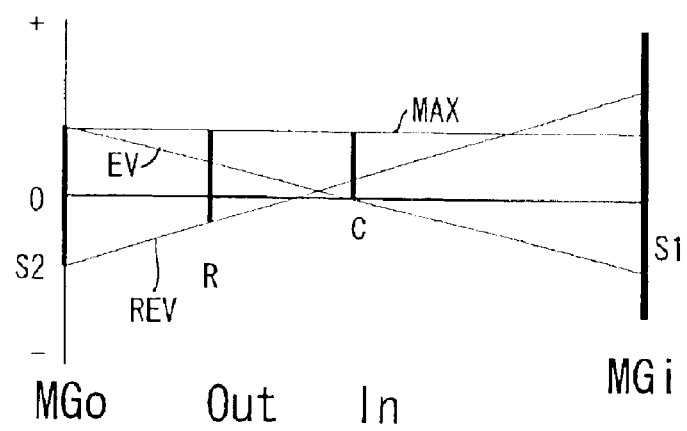

[FIGS. 3A and 3B: Embodiment 3]

The differences from the construction of FIG. 1A reside in that the clutch CL and the brake B are omitted, and in that the motor-generators MGi and MGo which have a large weight and rotate at high speed are arranged between the engine Eg and the planetary gear trains P1 and P2 to reduce vibrations from the motor-generators MGi and MGo. The rotor shaft Jmo of the motor-generator MGo is folded back on the engine side and is connected to the sun gear S2 of the planetary gear train P2 through the hollow inner rotor shaft Jmi.

Figure 4A:
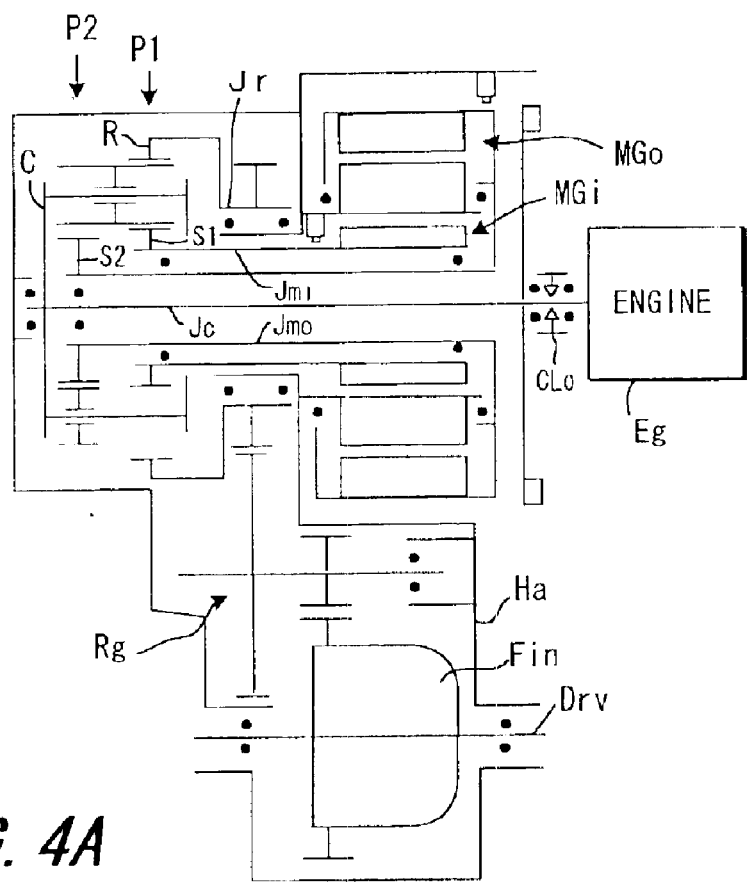
FIG. 4A is a schematic construction diagram of the fourth embodiment of the present invention and FIG. 4B is its alignment chart.
Figure 4B:
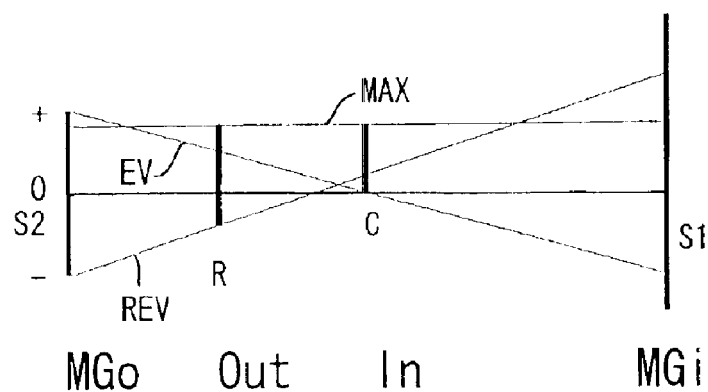

[FIGS. 4A and 4B: Embodiment 4]

Contrary to the Embodiment as shown in FIG. 3A, the coupling portion between the ring gear R and the reduction gear Rg is disposed on the motor-generator side to reduce the size of the drivetrain more.

Figure 5A:
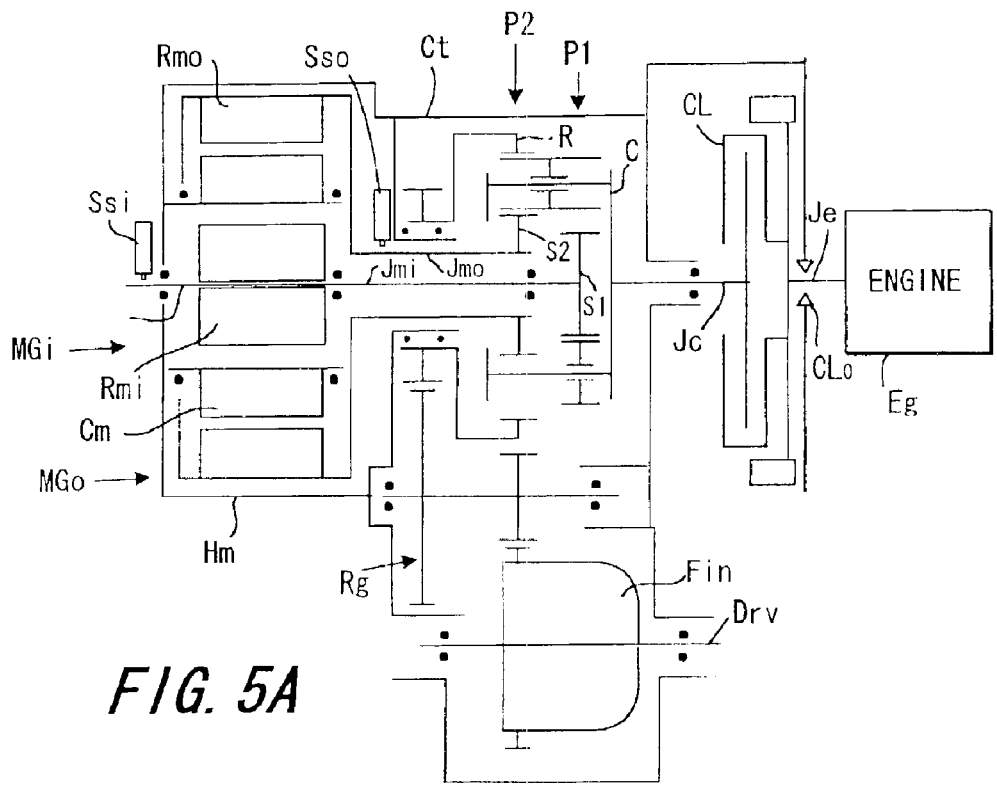
FIG. 5A is a schematic construction diagram of the fifth embodiment of the present invention and FIG. 5B is its alignment chart.
Figure 5B:
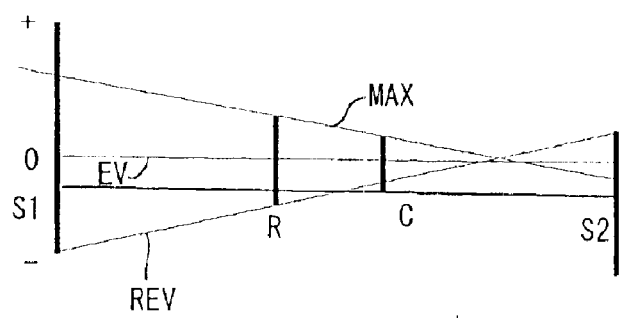

[FIGS. 5A and 5B: Embodiment 5]

The clutch CL is added to the construction of FIG. 2A.

Figure 6A:
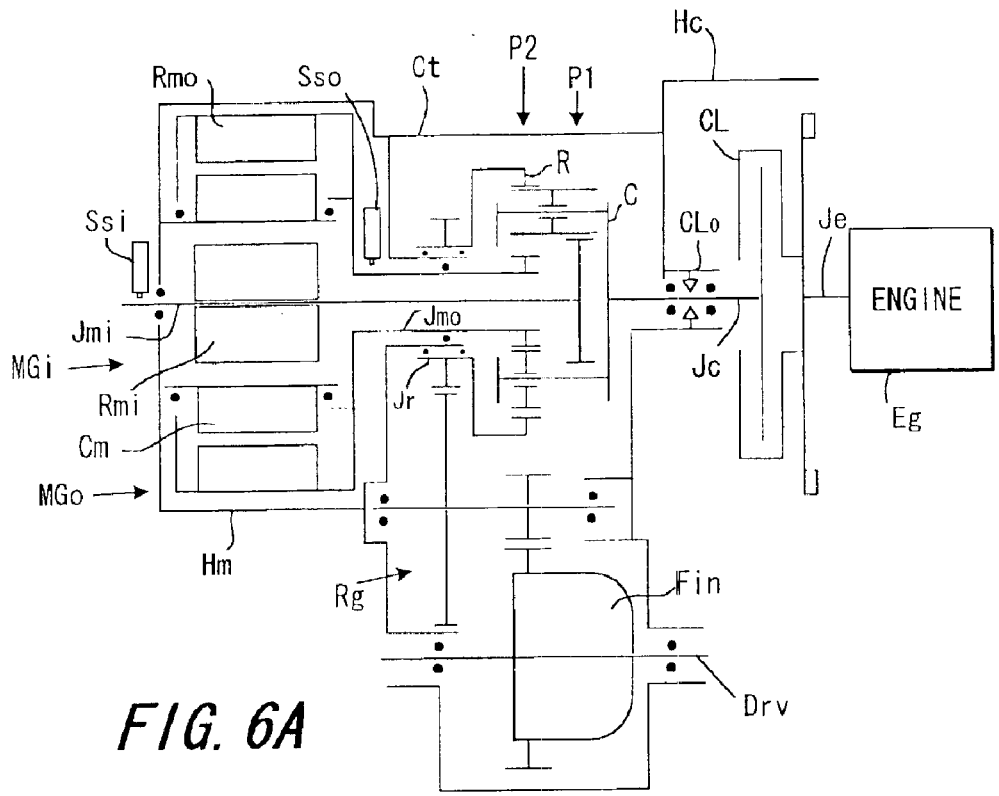
FIG. 6A is a schematic construction diagram of the sixth embodiment of the present invention and FIG. 6B is its alignment chart.
Figure 6B:
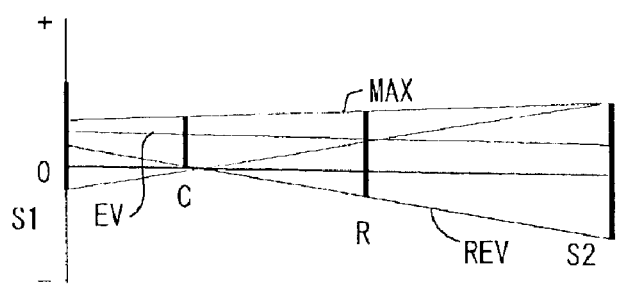

[FIGS. 6A and 6B: Embodiment 6]

The differences from the construction of FIG. 1A reside in that the brake B is omitted, and in that the carrier shaft Jc is the input shaft connected to the engine output shaft Je via the clutch CL whereas the ring gear shaft Jr is connected as the output shaft to the final reduction mechanism Fin via the reduction gear Rg.

Figure 7A:
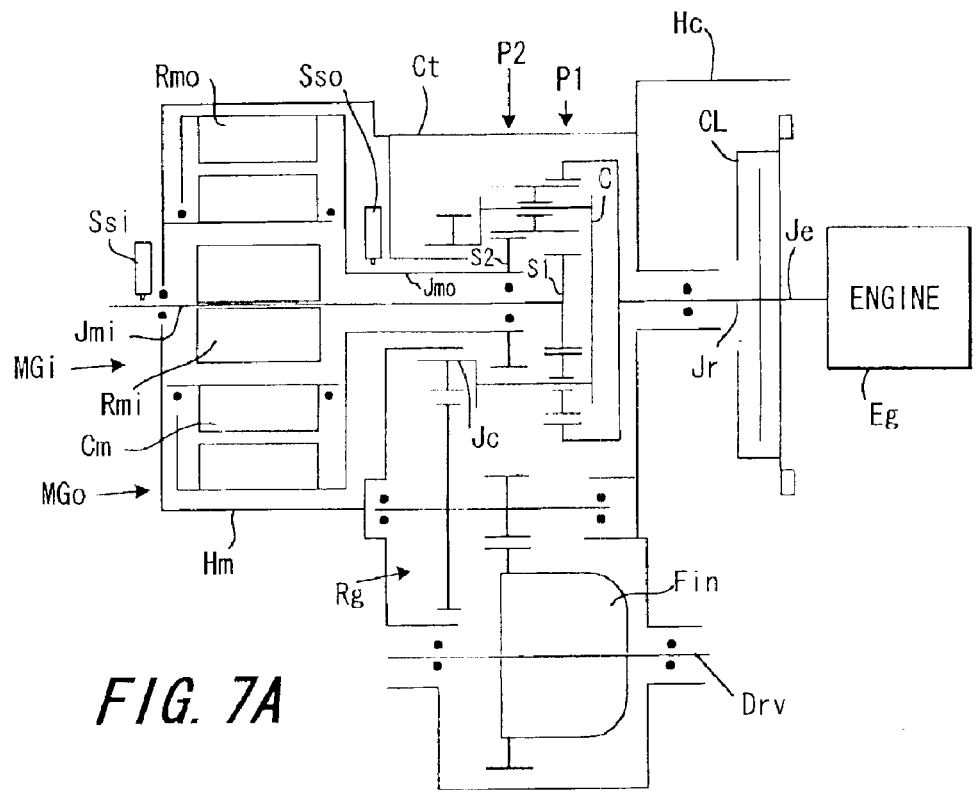
FIG. 7A is a schematic construction diagram of the seventh embodiment of the present invention and FIG. 7B is its alignment chart.
Figure 7B:
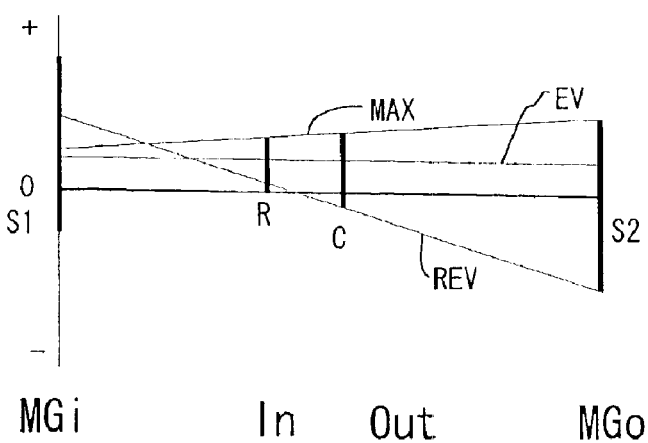

[FIGS. 7A and 7B: Embodiment 7]

The difference from the construction of FIG. 2A resides in that the ring gear shaft Jr is the input shaft connected to the engine output shaft Je via the clutch CL whereas the carrier shaft Jc is the output shaft connected to the final reduction mechanism Fin via the reduction gear Rg.

Figure 8A:
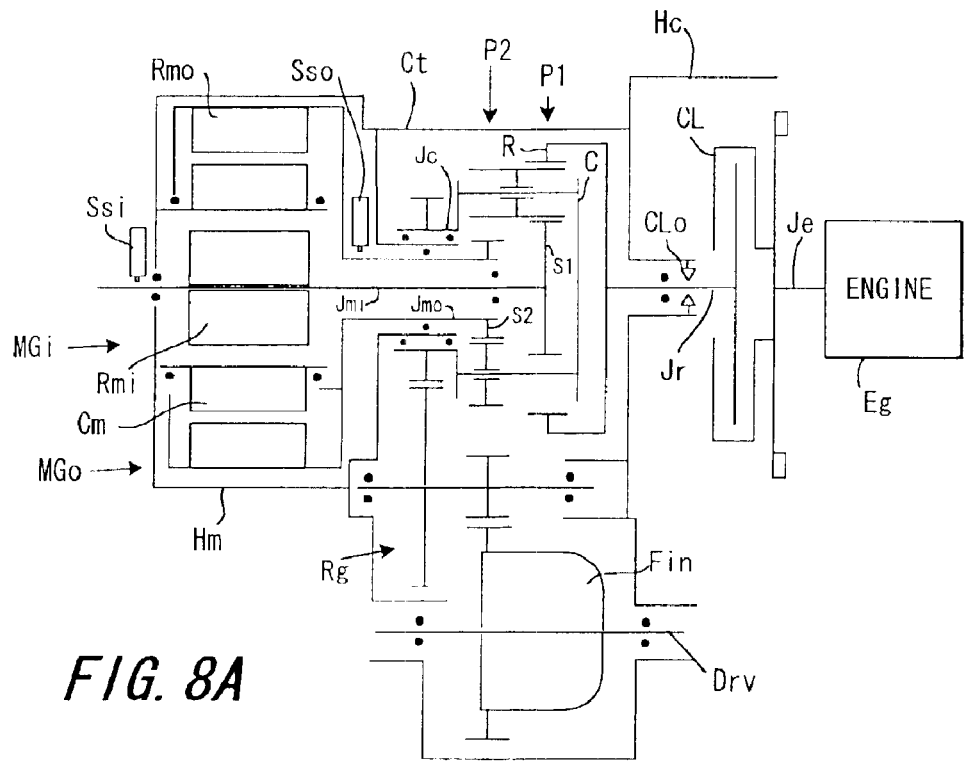
FIG. 8A is a schematic construction diagram of the eighth embodiment of the present invention and FIG. 8B is its alignment chart.
Figure 8B:
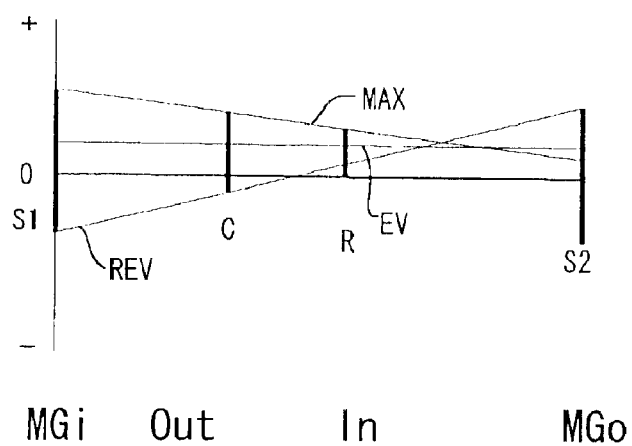

[FIGS. 8A and 8B: Embodiment 8]

The difference from the construction of FIG. 7A resides in that the planetary gear train P1 is a single-pinion type whereas the planetary gear train P2 is a double-pinion type.

Figure 9A:
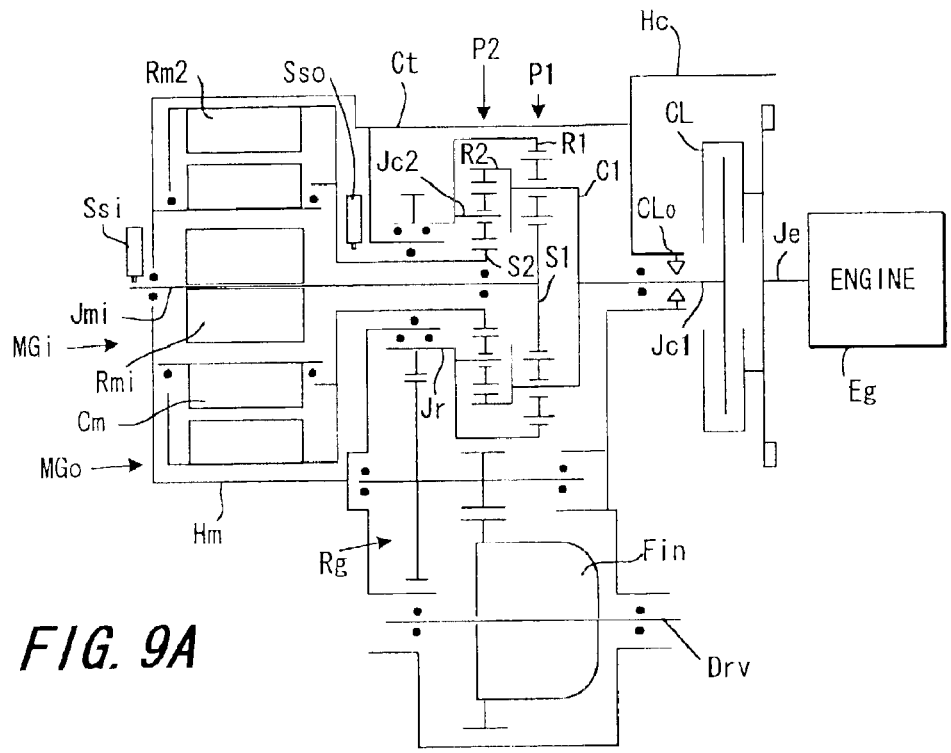
FIG. 9A is a schematic construction diagram of the ninth embodiment of the present invention and FIG. 9B is its alignment chart.
Figure 9B:
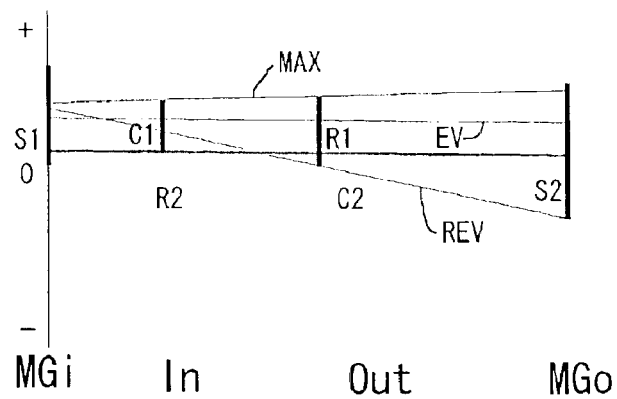

[FIG. 9A and 9B: Embodiment 9]

The differences from the construction of FIG. 8A reside in that the planetary gear trains P1 and P2 are a single-pinion type, in that the carrier C1 of the planetary gear train P 1 and the ring gear R2 of the planetary gear train P2 are connected whereas the ring gear R1 of the planetary gear train P1 and the carrier C2 of the planetary gear train p2 are connected, and in that the carrier shaft Jc1 of the planetary gear train P1 is the input shaft connected to the engine Eg whereas the carrier shaft Jc2 of the planetary gear train P2 is the output shaft connected to the final reduction mechanism Fin.

Figure 10A:
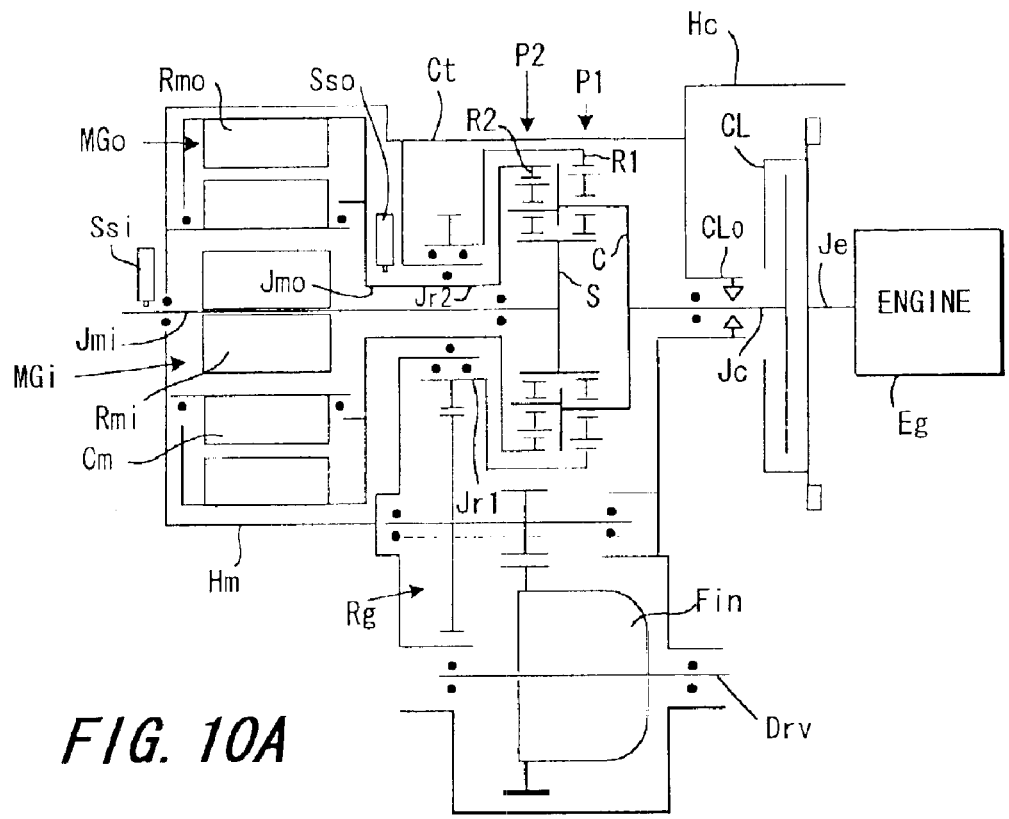
FIG. 10A is a schematic construction diagram of the tenth embodiment of the present invention and FIG. 10B is its alignment chart.
Figure 10B:
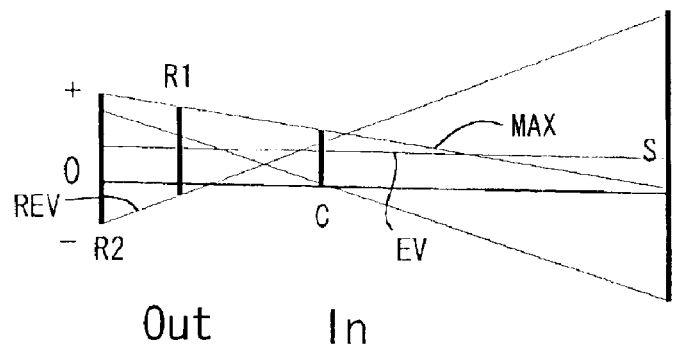

[FIGS. 10A and 10B: Embodiment 10]

The differences from the construction of FIG. 8A reside in that the planetary gear trains P1 and P2 are a single-pinion type, and in that a common sun gear S is connected to the rotor shaft Jmi of the motor-generator MGi whereas the carrier shaft Jc of the common carrier C is the input shaft connected to the engine Eg. Moreover, the ring gear shaft Jr2 of the planetary gear train P2 is connected to the rotor shaft Jmo of the motor-generator MGo whereas the ring gear shaft Jr1 of the planetary gear train P1 is connected to the final reduction mechanism Fin via the reduction gear Rg.

Figure 11A:
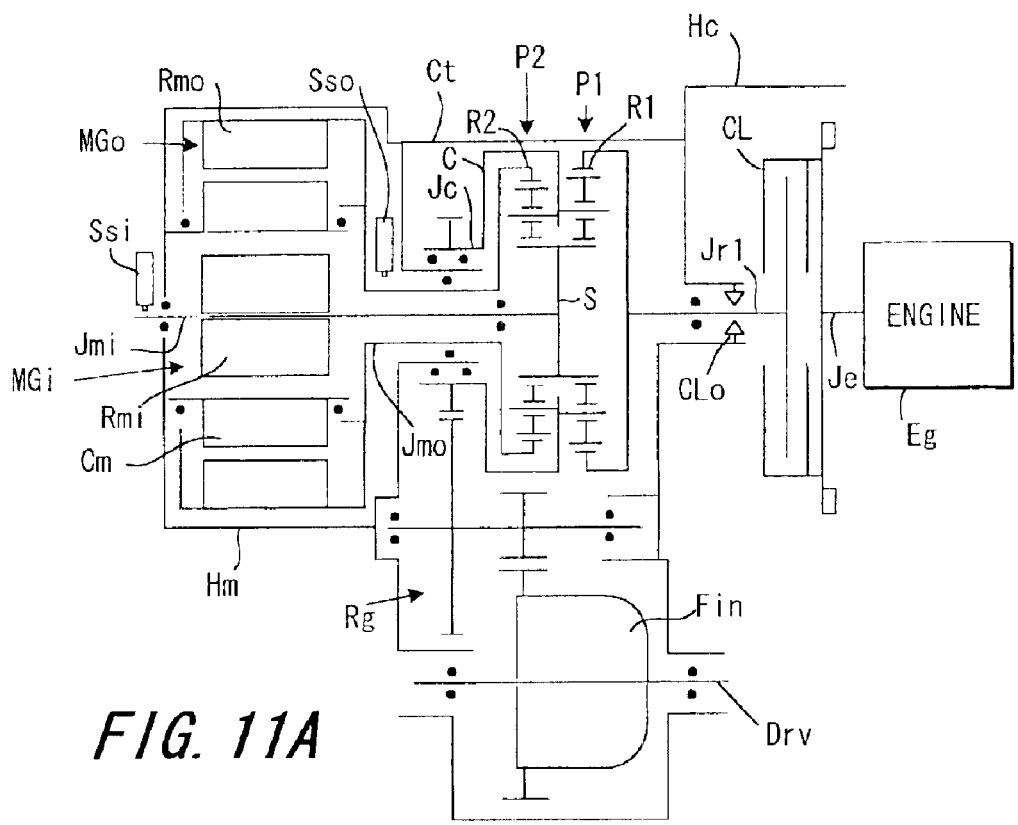
FIG. 11A is a schematic construction diagram of the eleventh embodiment of the present invention and FIG. 11B is its alignment chart.
Figure 11B:
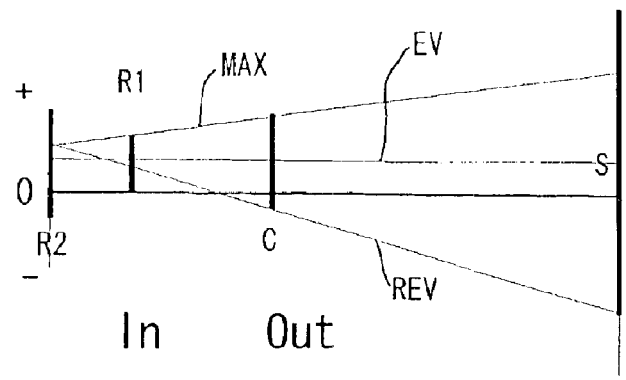

[FIGS. 11A and 11B: Embodiment 11]

The differences from the construction of FIG. 10A reside in that the ring gear shaft Jr1 of the planetary gear train P1 is connected to the engine Eg, and in that the common carrier shaft Jc of the planetary gear trains P1 and P2 is the output shaft connected to the final reduction mechanism Fin via the reduction gear Rg.

Figure 12A:
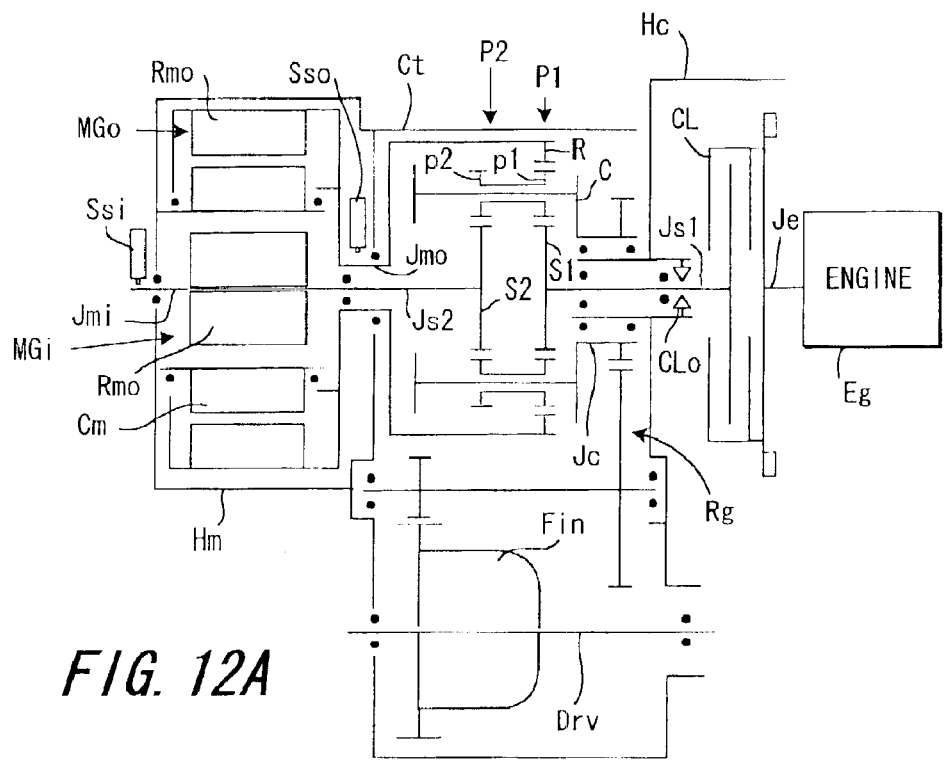
FIG. 12A is a schematic construction diagram of the twelfth embodiment of the present invention and FIG. 12B is its alignment chart.
Figure 12B:
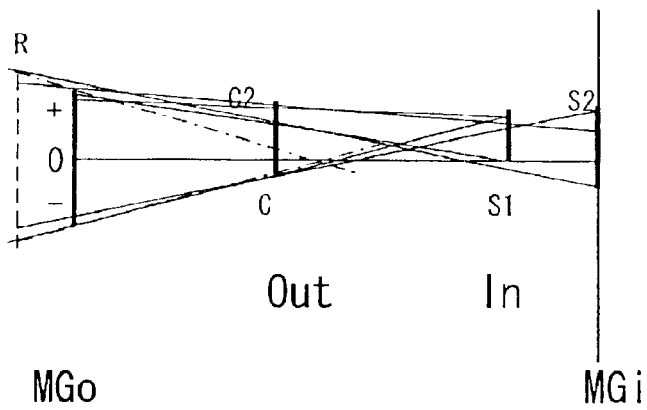

[FIGS. 12A and 12B: Embodiment 12]

The differences from the construction of FIG. 7A reside in that the planetary gear trains P1 and P2 are a single-pinion type, and in that the common ring gear R is connected to the outer rotor shaft Jmo whereas the carrier shaft Jc of the common carrier C is connected to the final reduction mechanism Fin via the reduction gear Rg. Moreover, the tooth number ratio between the pinion p1 and the sun gear S1 of the planetary gear train P1 and the tooth number ratio of the pinion p2 and the sun gear S2 of the planetary gear train P2 are made different, the pinions p1 and p2 rotate integrally, and the sun gear shaft Js1 of the planetary gear train P1 is the input shaft connected to the engine Eg via the clutch CL whereas the sun gear shaft Js2 of the planetary gear train P2 is connected to the inner rotor shaft Jmi.

Figure 13A:
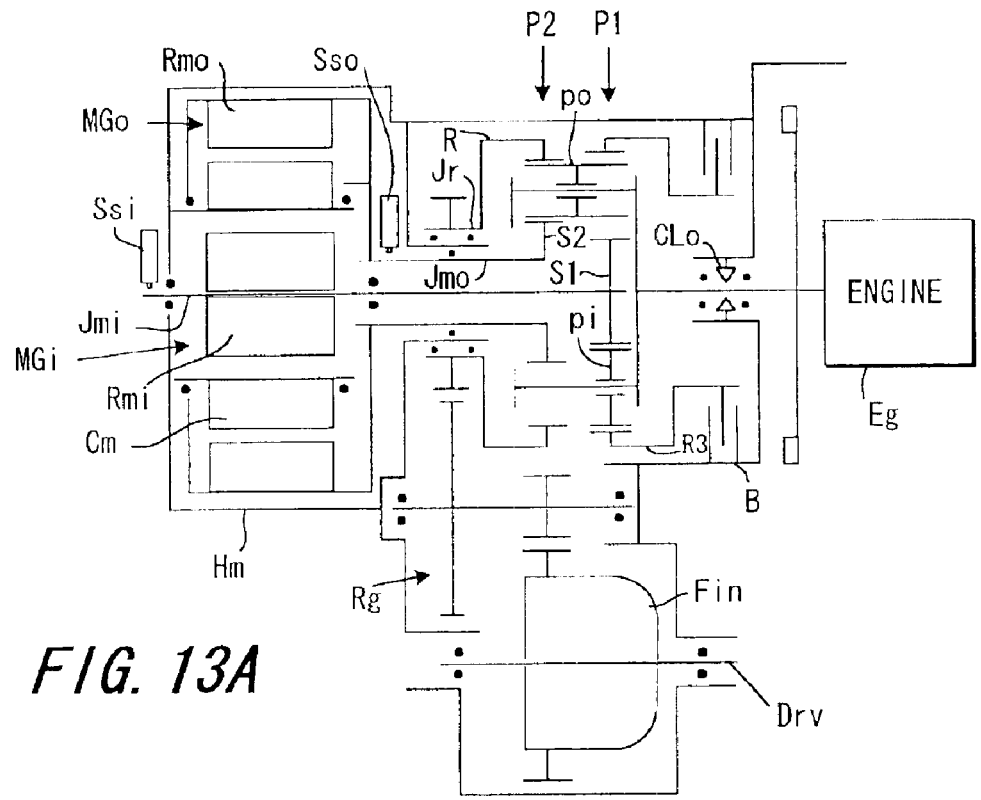
FIG. 13A is a schematic construction diagram of the thirteenth embodiment of the present invention and FIG. 13B is its alignment chart.
Figure 13B:
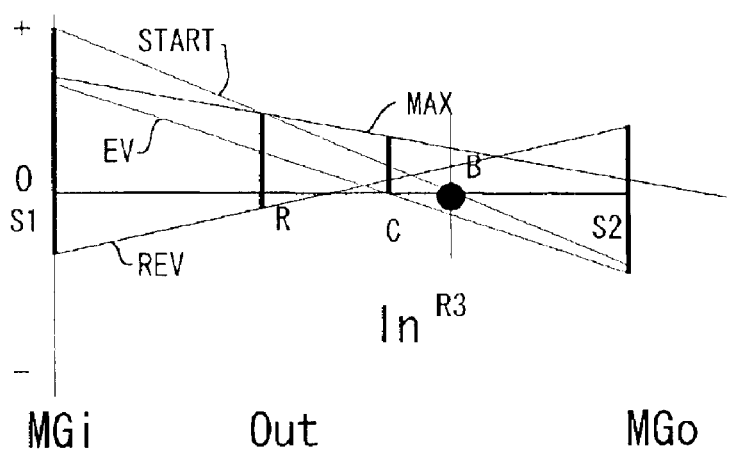

[FIGS. 13A and 13B: Embodiment 13]

The differences from the construction of FIG. 2A reside in that the ring gear R3 meshes with the inner pinions pi of the planetary gear train P1, and in that the brake B brakes the ring gear R3.

Figure 14A:
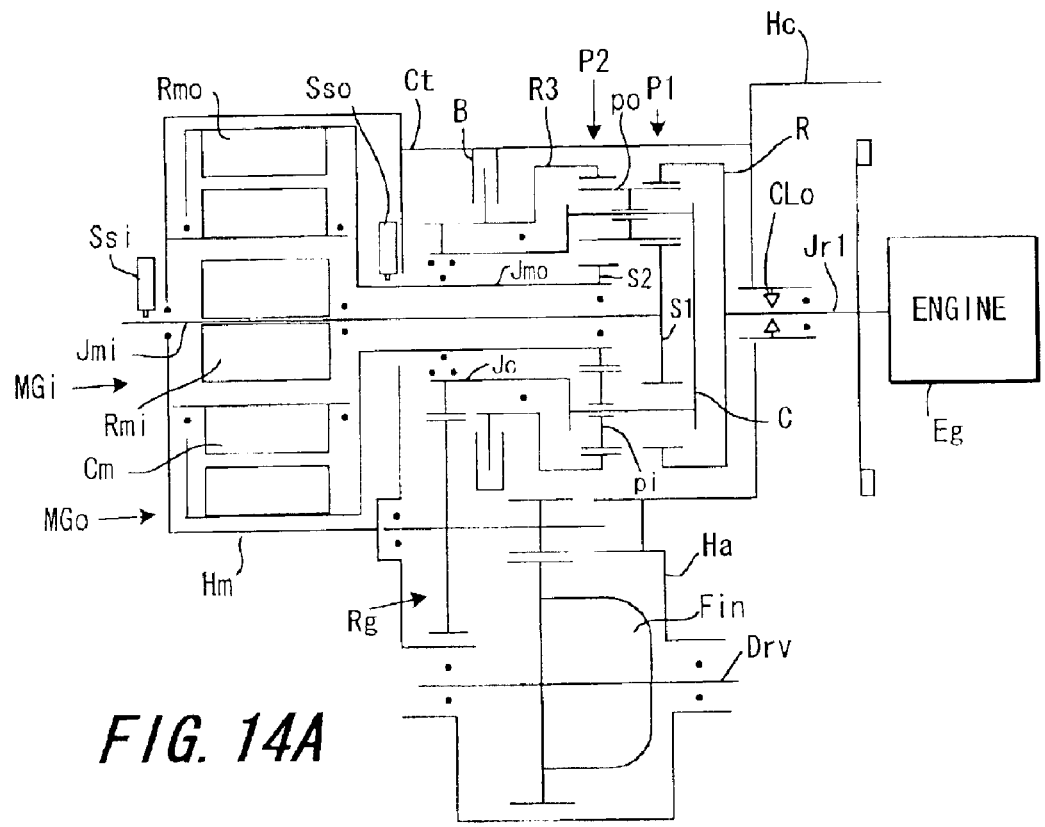
FIG. 14A is a schematic construction diagram of the fourteenth embodiment of the present invention and FIG. 14B is its alignment chart.
Figure 14B:
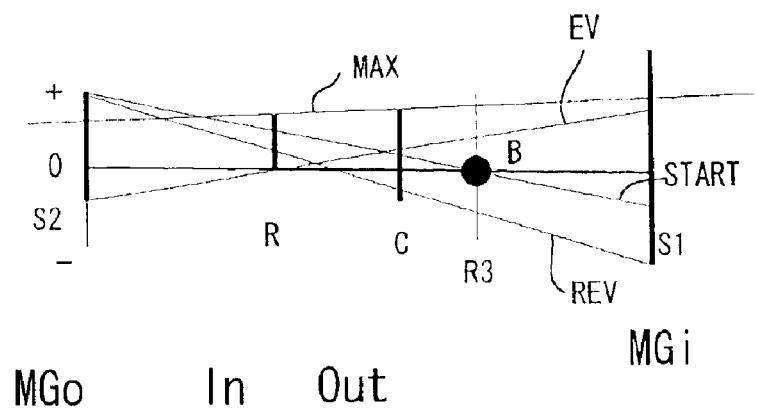

[FIGS. 14A and 14B: Embodiment 14]

The differences from the construction of FIG. 8A reside in that the ring gear R3 meshes with the inner pinions pi of the planetary gear train P2, and in that the brake B brakes the ring gear R3.

Figure 15A:
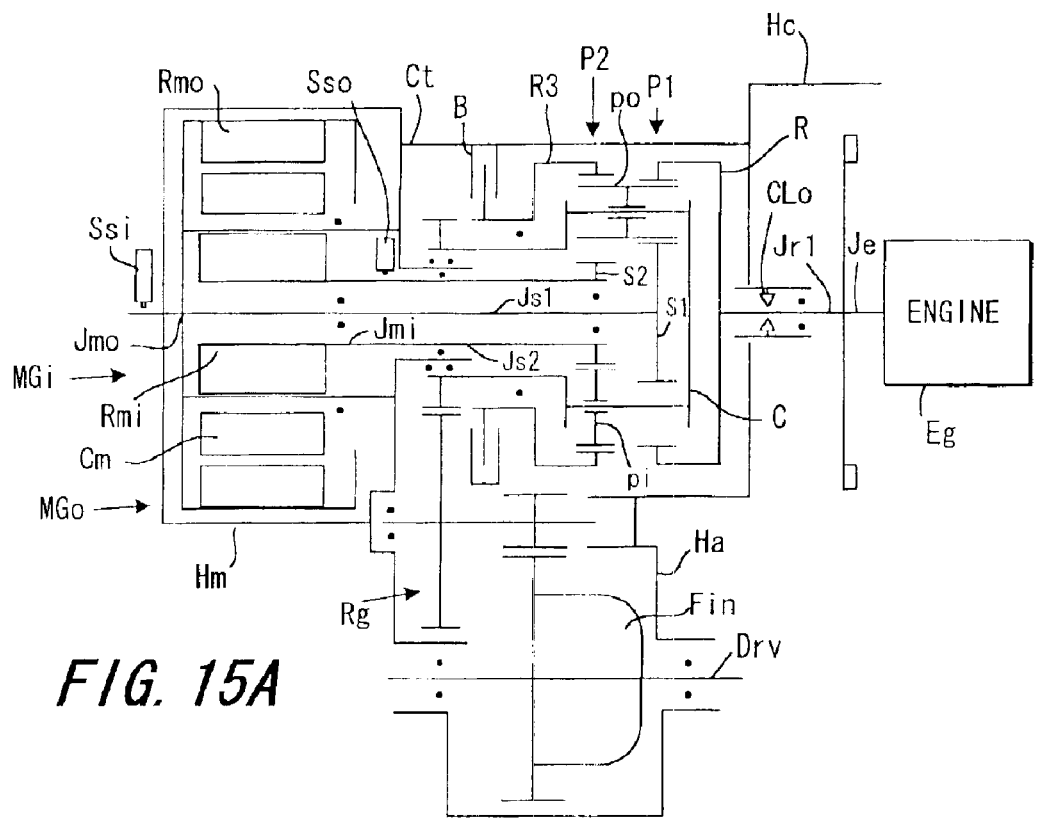
FIG. 15A is a schematic construction diagram of the fifteenth embodiment of the present invention and FIG. 15B is its alignment chart.
Figure 15B:
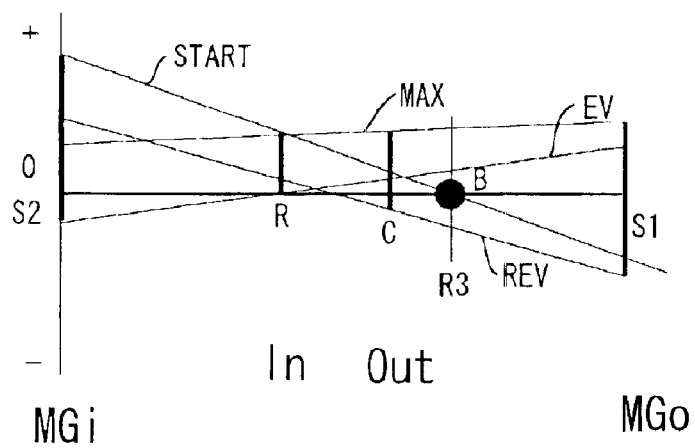

[FIGS. 15A and 15B: Embodiment 15]

The difference from the construction of FIG. 14A resides in that the sun gear shaft Js1 of the planetary gear train P1 is connected to the outer rotor shaft Jmo whereas the sun gear shaft Js2 of the P2 is connected to the inner rotor shaft Jmi.

Figure 16A:
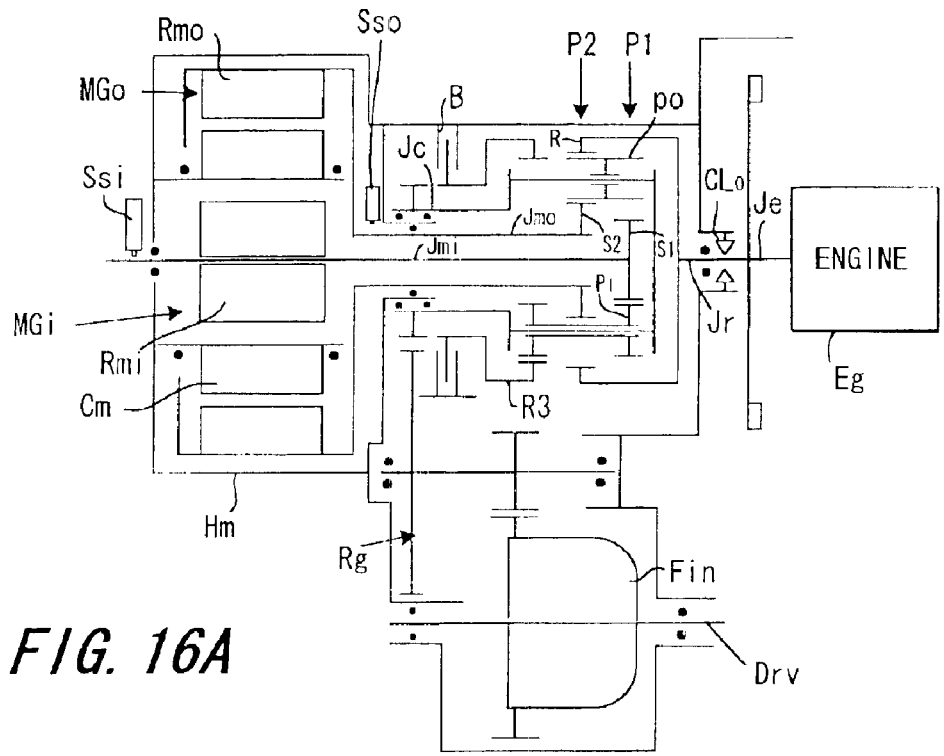
FIG. 16A is a schematic construction diagram of the sixteenth embodiment of the present invention and FIG. 16B is its alignment chart.
Figure 16B:
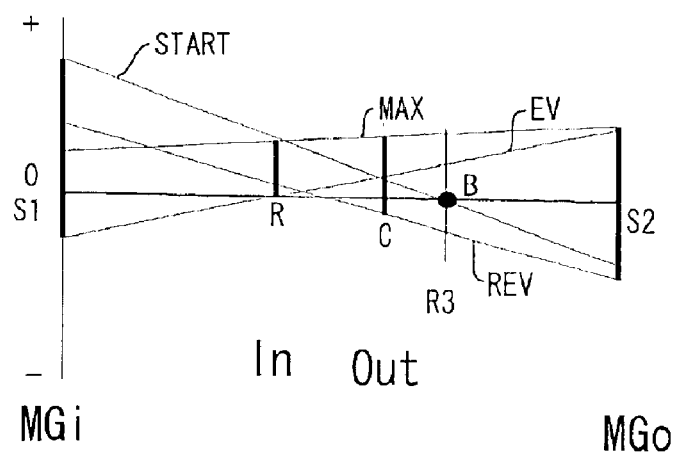

[FIGS. 16A and 16B: Embodiment 16]

The differences from the construction of FIG. 13A reside in that the inner pinions pi of the planetary gear train P1 is shaped to have a small diameter and a tooth face split across the sun gear S2, the ring gear R3 having no axial overlap with the outer pinions po meshes with the inner pinions pi, and in that the ring gear shaft Jr is the input shaft connected to the engine output shaft Je whereas the carrier shaft Jc is the output shaft connected to the final reduction mechanism Fin via the reduction gear Rg.

Figure 17A:
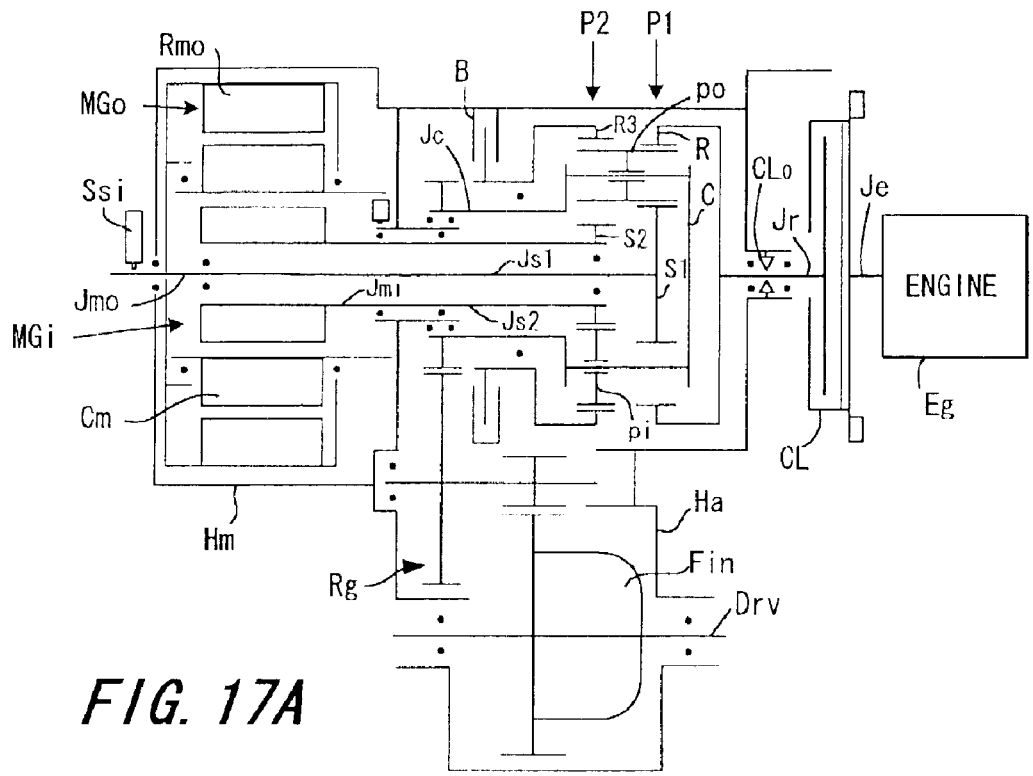
FIG. 17A is a schematic construction diagram of the seventeenth embodiment of the present invention and FIG. 17B is its alignment chart.
Figure 17B:
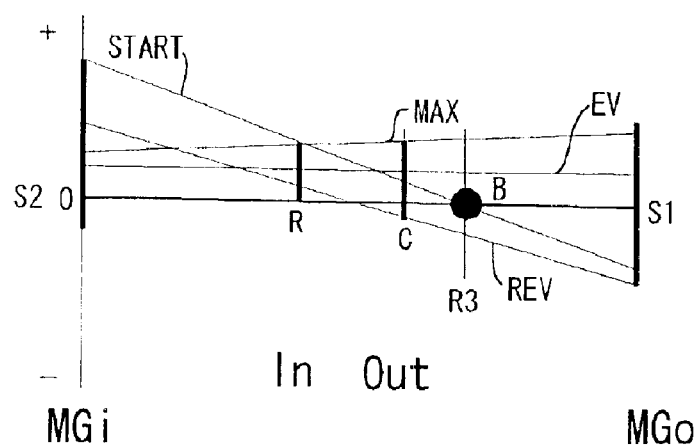

[FIGS. 17A and 17B: Embodiment 17]

The difference from the construction of FIG. 15A resides in that the ring gear shaft Jr is the input shaft connected to the engine output shaft Je via the clutch CL.

Figure 18A:
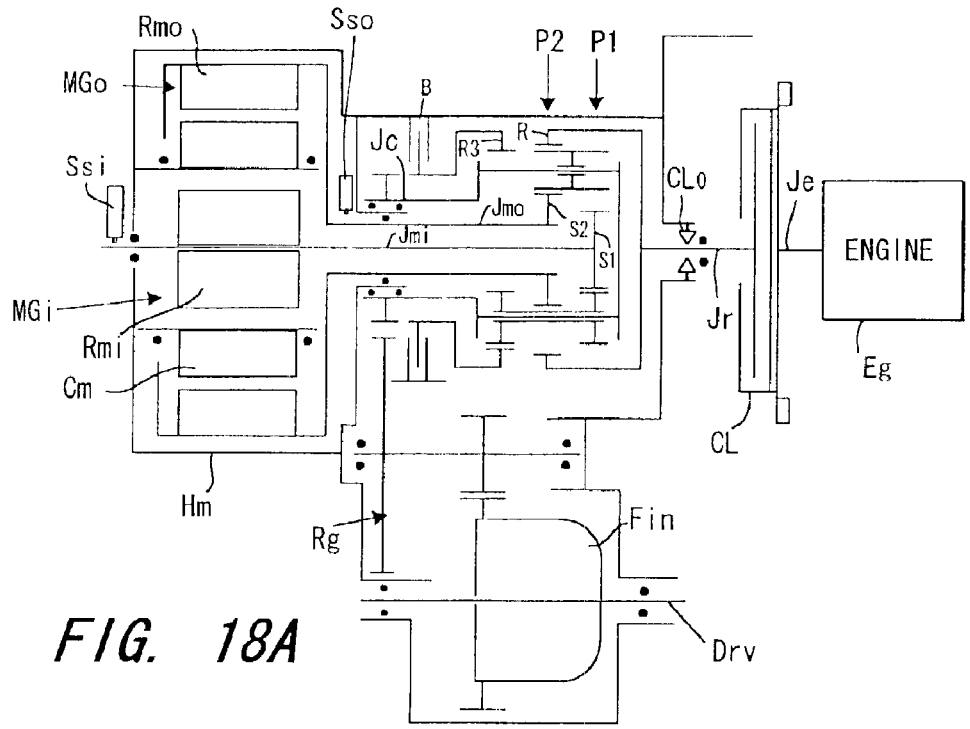
FIG. 18A is a schematic construction diagram of the eighteenth embodiment of the present invention and FIG. 18B is its alignment chart.
Figure 18B:
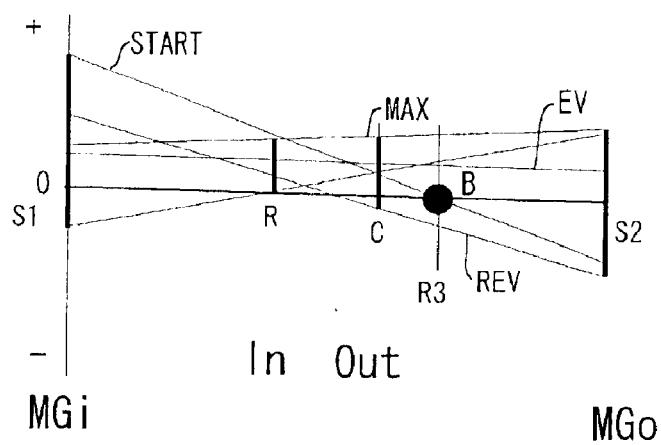

[FIGS. 18A and 18B: Embodiment 18]

The difference from the construction of FIG. 16A resides in that the ring gear shaft Jr is the input shaft connected to the engine output shaft Je via the clutch CL.

Figure 19A:
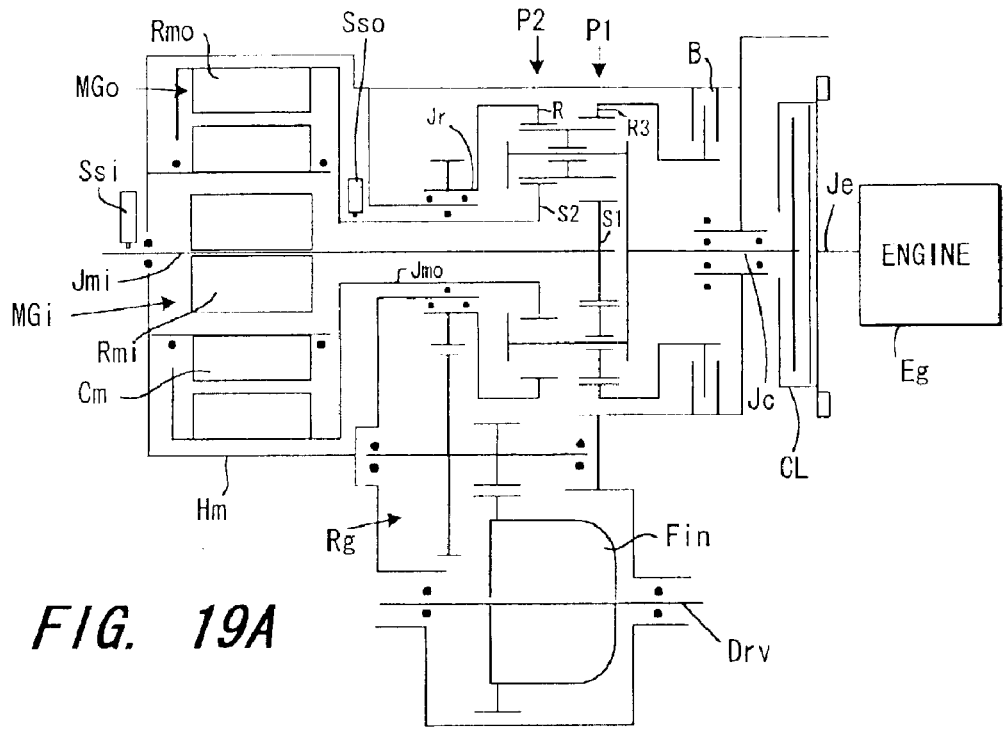
FIG. 19A is a schematic construction diagram of the nineteenth embodiment of the present invention and FIG. 19B is its alignment chart.
Figure 19B:
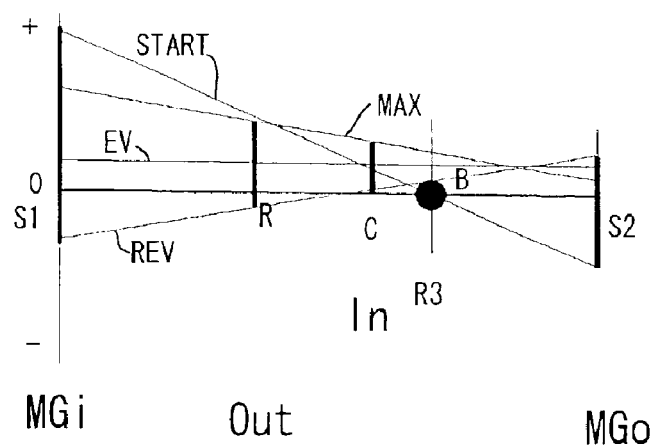

[FIGS. 19A and 19B: Embodiment 19]

The difference from the construction of FIG. 13A resides in that the carrier shaft Jc is the input shaft connected to the engine output shaft Je via the clutch CL.

Figure 20A:
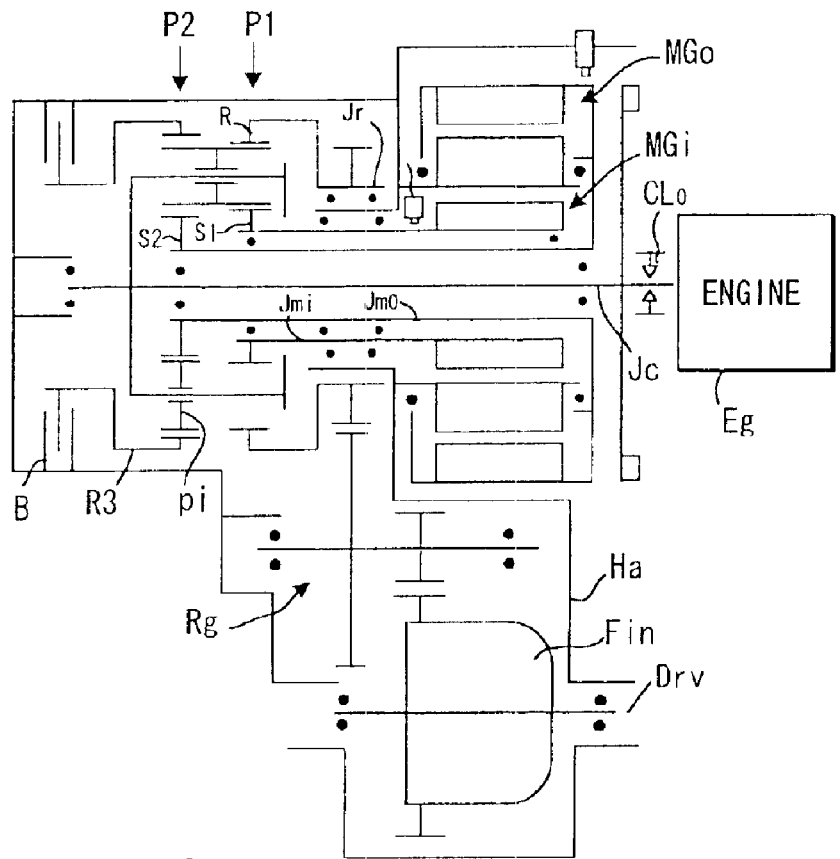
FIG. 20A is a schematic construction diagram of the twentieth embodiment of the present invention and FIG. 20B is its alignment chart.
Figure 20B:
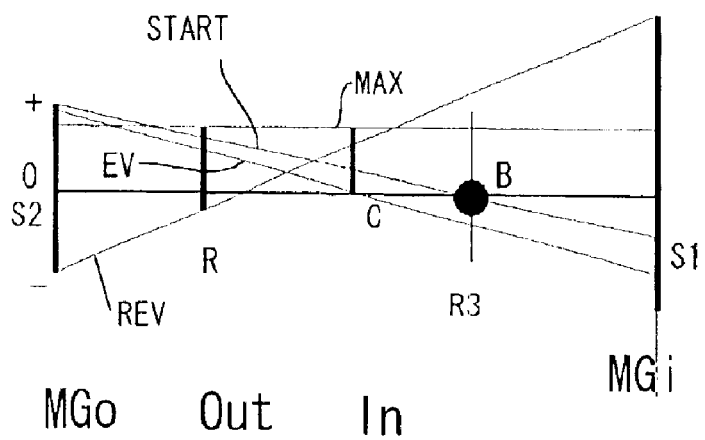

[FIGS. 20A and 20B: Embodiment 20]

The differences from the construction of FIG. 4A reside in that the ring gear R3 meshes with the inner pinions pi of the planetary gear train P2, and in that the brake B brakes the ring gear R3.

Figure 21A:
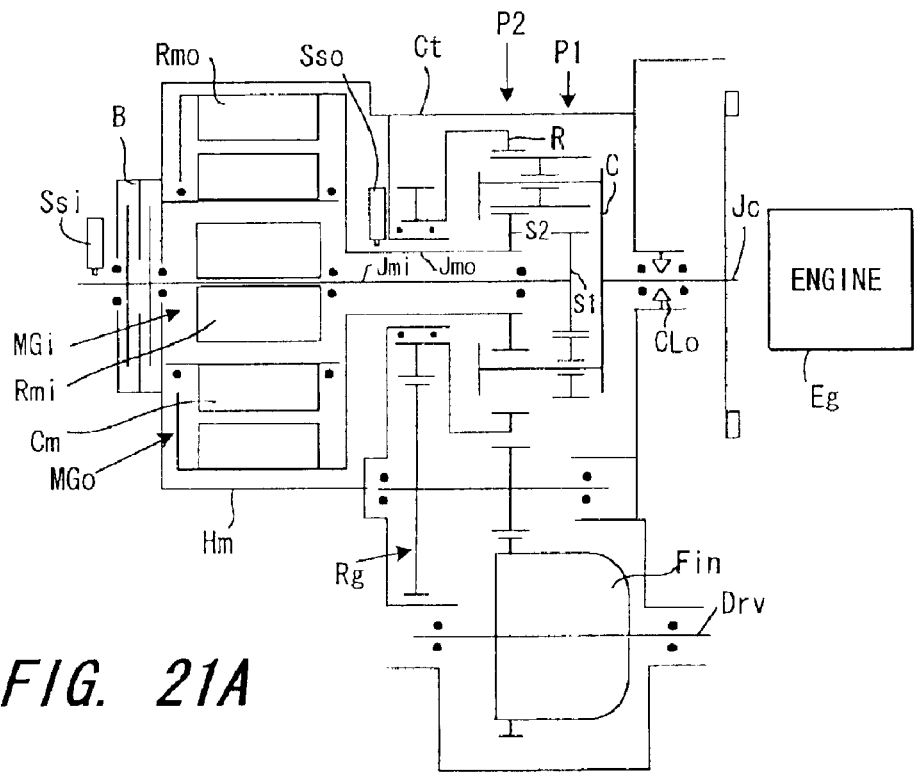
FIG. 21A is a schematic construction diagram of the twenty-first embodiment of the present invention and FIG. 21B is its alignment chart.
Figure 21B:
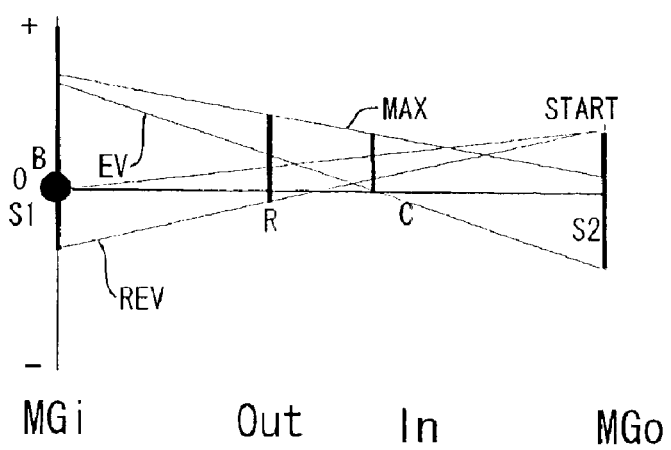

[FIGS. 21A and 21B: Embodiment 21]

The difference from the construction of FIG. 5A resides in that the construction is provided with the brake B for braking the inner rotor shaft Jmi.

Figure 22A:
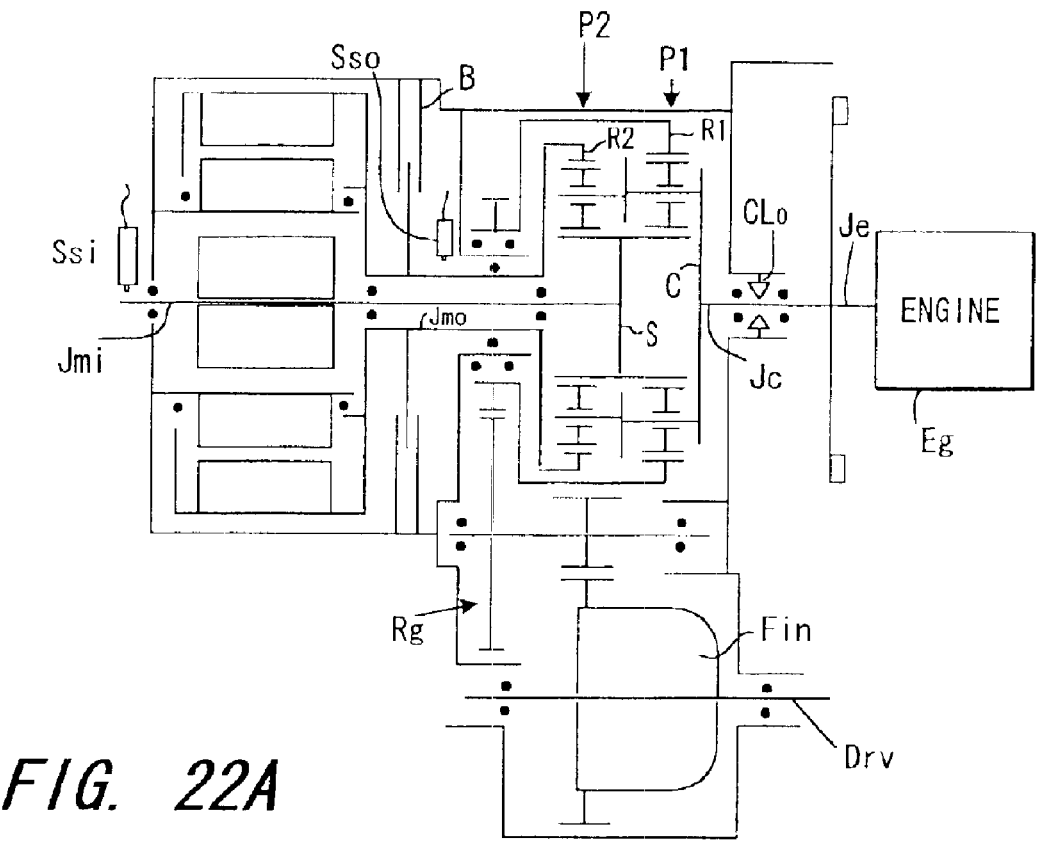
FIG. 22A is a schematic construction diagram of the twenty-second embodiment of the present invention and FIG. 22B is its alignment chart.
Figure 22B:
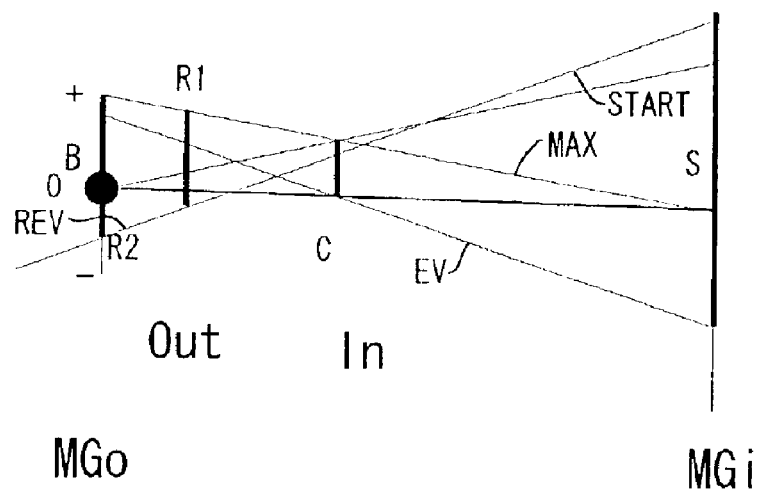

[FIGS. 22A and 22B: Embodiment 22]

The differences from the construction of FIG. 10A reside in that the clutch CL is omitted and the construction is provided with the brake B for braking the ring gear R2 of the planetary gear train P2.

Figure 23A:
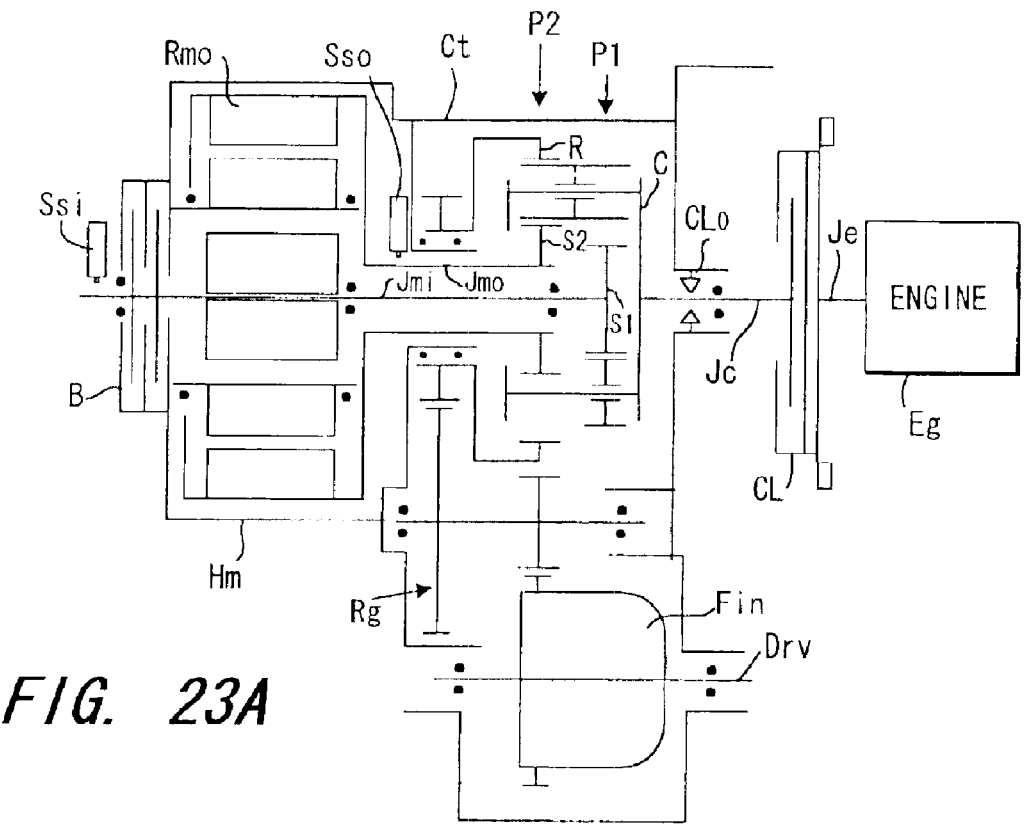
FIG. 23A is a schematic construction diagram of the twenty-third embodiment of the present invention and FIG. 23B is its alignment chart.
Figure 23B:
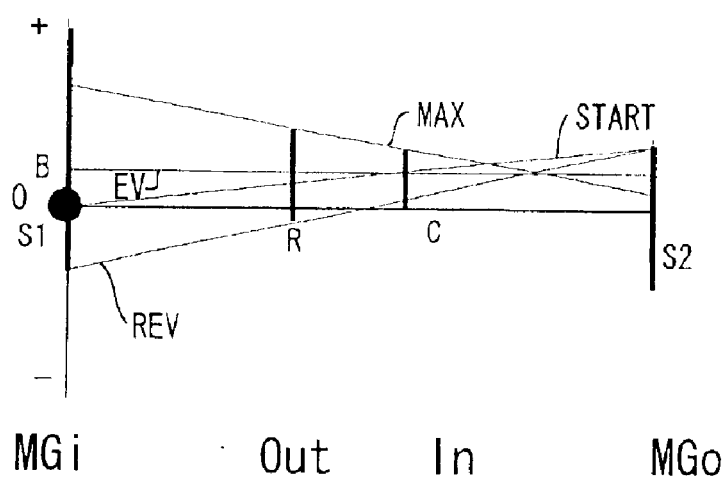

[FIGS. 23A and 23B: Embodiment 23]

The difference from the construction of FIG. 21A resides in that the carrier shaft Jc is the input shaft connected to the engine output shaft Je via the clutch CL.

Figure 24A:
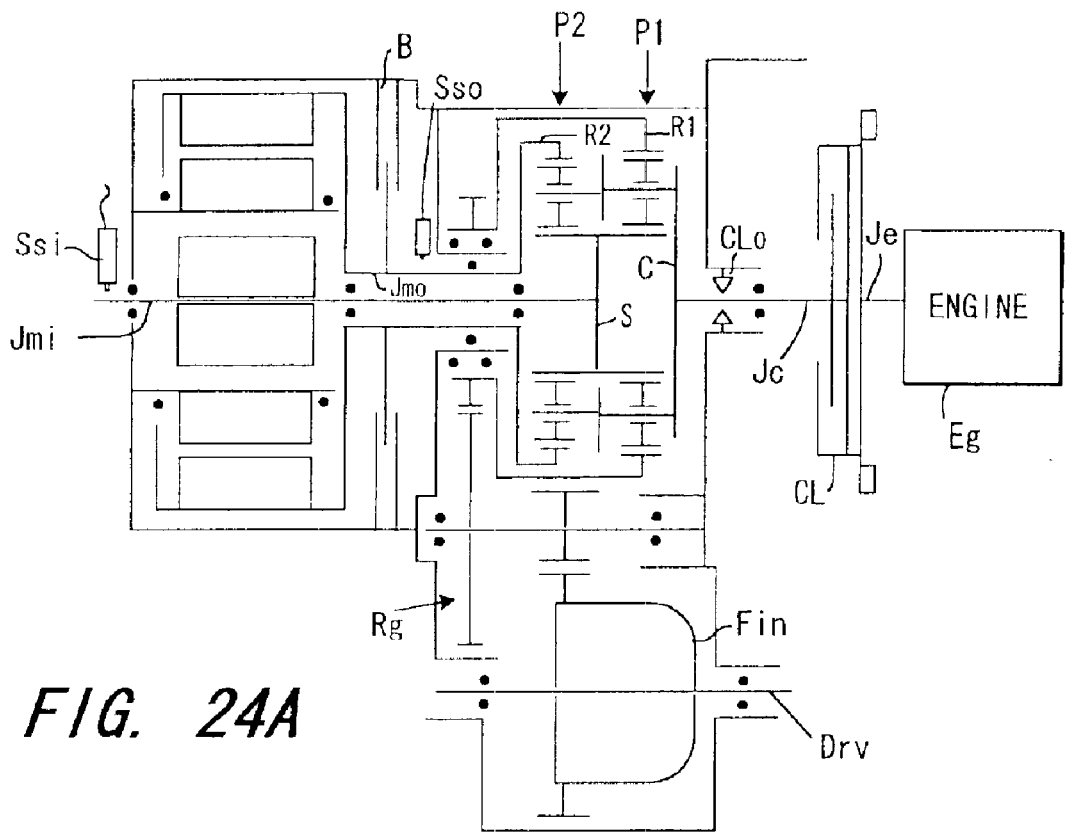
FIG. 24A is a schematic construction diagram of the twenty-fourth embodiment of the present invention and FIG. 24B is its alignment chart.
Figure 24B:
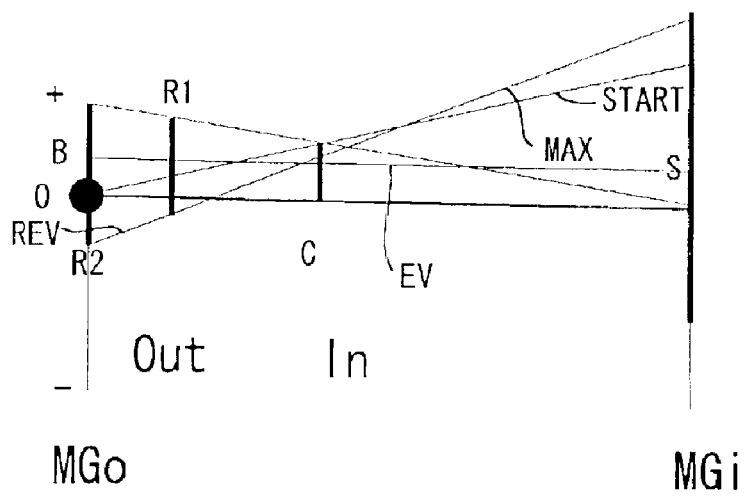

[FIGS. 24A and 24B: Embodiment 24]

The difference from the construction of FIG. 22A resides in that the carrier shaft Jc is the input shaft connected to the engine output shaft Je via the clutch CL.

Figure 25A:
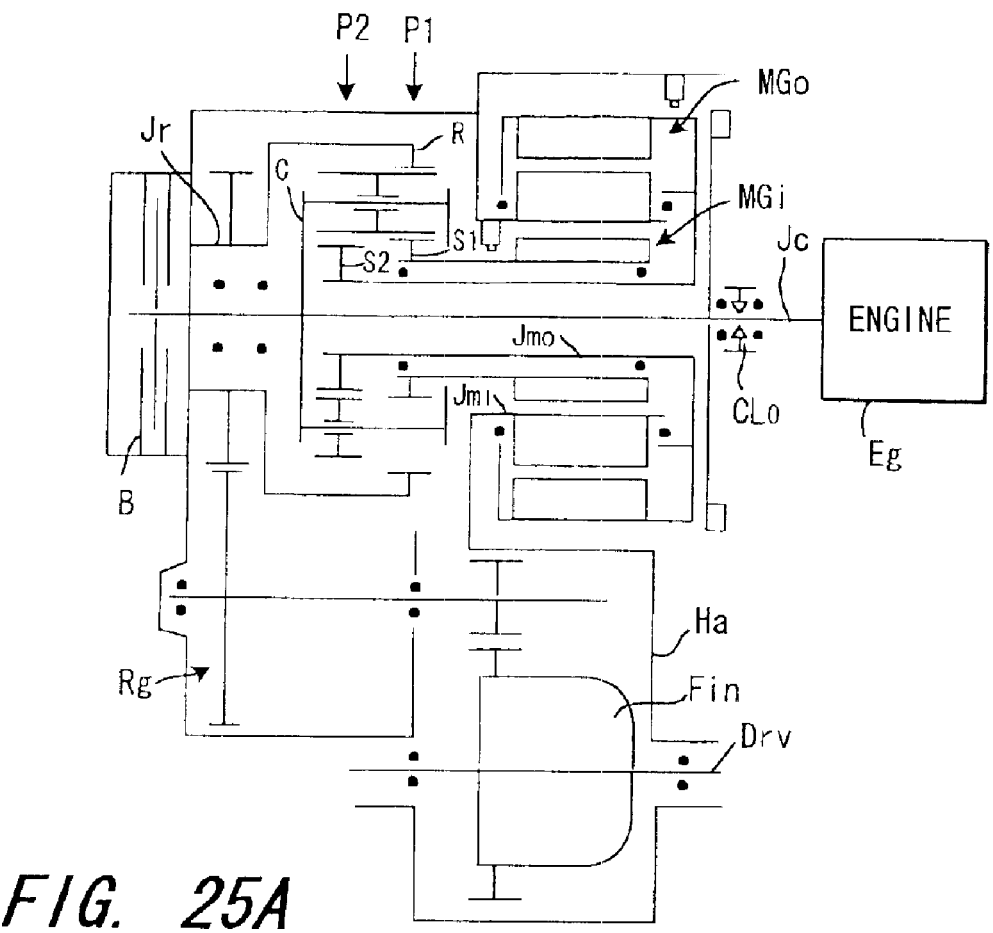
FIG. 25A is a schematic construction diagram of the twenty-fifth embodiment of the present invention and FIG. 25B is its alignment chart.
Figure 25B:
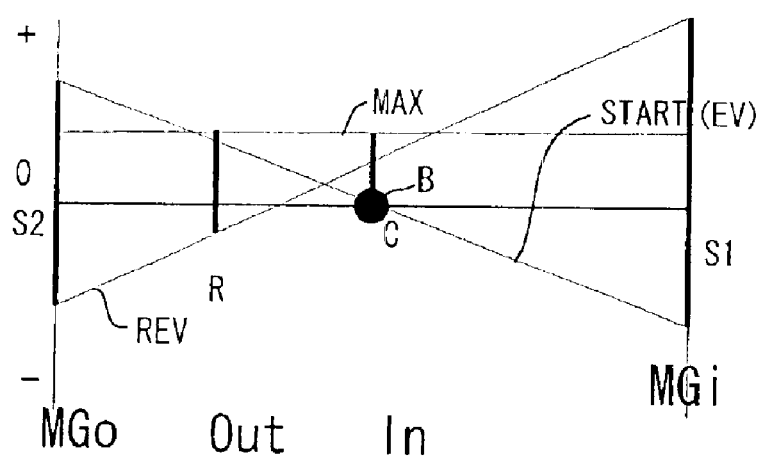

[FIGS. 25A and 25B: Embodiment 25]

The difference from the construction of FIG. 3A resides in that the construction is provided with the brake B for braking the carrier shaft Jc which is the input shaft.

The inventions supported by the above-mentioned embodiments are as follows:

In the first invention, there is provided the drivetrain including the differential mechanism having four or more input/output elements arrayed on the alignment chart. The input from the engine is assigned to one of two elements of the elements arrayed on the inner side whereas the output to output shaft is assigned to the other, the motor-generators are connected to the two elements arrayed on the two outer sides of the inner elements.

In the second invention, the differential mechanism is constructed of the planetary gear mechanism.

In the third invention, the planetary gear mechanism includes the single-pinion type first planetary gear train and the double-pinion type second planetary gear train, any two elements of the sun gears, carriers and ring gears are shared to construct the two-freedom-degree, four-element differential mechanism.

In the fourth invention, of the two motor-generators of the first invention, one connected to the element closer to the element assigned to the output shaft is rotated at a higher speed than the other motor-generator.

In the fifth invention, the two motor-generators of the first invention are constructed by inner and outer rotors arranged coaxially.

In the sixth invention, the inner one of the two rotors of the fifth invention is rotated at a higher speed than the outer one.

In the seventh invention, the motor-generators of the fifth invention having the inner and outer rotors are arranged between the planetary gear mechanism and the engine, and the outer rotor shaft of the motor-generators is folded back on the engine side and is connected to one element of the planetary gear mechanism through the hollow inner rotor shaft.

In the eighth invention, the differential mechanism of the second invention is connected through the reduction gear to the drive shaft arranged in parallel with the planetary gear mechanism, to construct the drivetrain of the front-wheel drive vehicle.

In the ninth invention, the rotation transmission mechanism is disposed in the coupling portion of the element of the differential mechanism of the first invention.

In the tenth invention, the reverse rotation preventing mechanism is connected to the engine of the first invention.

According to the first and subsequent inventions, the motor-generator is connected to the element which is positioned on the outer side of the element connected to the engine or the output shaft on the alignment chart of the differential mechanism having four or more elements. The ratio, as shared by the motor-generator, of the energy to be transmitted from the engine to the output shaft can be reduced. The size of the motor-generator is reduced accordingly and the transmission efficiency of the drivetrain is enhanced. This point will be described in detail with reference to the alignment chart, as follows.

FIGS. 26A–26D present a construction and alignment charts of the differential mechanism of four elements. Although the differential mechanism can be realized by various mechanisms, here will be representatively described the differential mechanism which is constructed, as shown, by combining a single-pinion type first planetary gear train P1 and a double-pinion type second planetary gear train P2.

In FIG. 26A, reference letter S designates the sun gear, C the planetary carrier (as will be shortly called the "carrier"), and R the ring gear. The suffix numeral 1 designates the components of the first planetary gear train P1, and the suffix numeral 2 designates the components of the second planetary gear train P2. Here, the second planetary gear train P2 is conveniently illustrated on its structure in diagrams exploded in a section extending through two pinion shafts.

Now, if the sun gear and the ring gear have respective tooth numbers of Za and Zr and if the sun gear, the carrier and the ring gear have respective rotation speeds of Na, Nc and Nr, the individual rotation speeds are expressed in the following relations (1) for the first planetary gear train P1 and (2) for the second planetary gear train P2:

$$(Zr+Za) \cdot Nc = Zr \cdot Nr + Za \cdot Na \qquad (1),$$

and $$(Zr-Za) \cdot Nc = Zr \cdot Nr - Za \cdot Na \qquad (2).$$

FIGS. 26B and 26C illustrate the relations of Formulas (1) and (2) respectively. If the tooth number is distributed on an abscissa and if the rotation speed of each element is expressed on an ordinate at a point distributed at a tooth number ratio, the rotation speeds of the elements always take linear relations proportional to the tooth ratio. In this planetary gear train of the three elements, where the motor-generator, the engine, the motor-generator for driving the drive shaft are connected to the each elements, the energy supported by the motor-generators increases and has an adverse effect on transmission efficiency, because of the limitation on the relationship between the speed ratio between the engine and the output shaft and the rotation speeds of the two motor-generators.

On the other hand, if two sets of planetary gear trains are combined by sharing the ring gear R1 and the carrier C1 of the first planetary gear train P1 with the ring gear R2 and the carrier C2 of the second planetary gear train P2, as illustrated, the elements to be connected to the input/output sides are four: the sun gear S1 of the first planetary gear train P1, the sun gear S2 of the second planetary gear train P2, and the carrier C (C1 and C2) and the ring gear R (R1 and R2) shared between the planetary gear trains. An alignment chart of this case is shown in FIG. 26D. This composite planetary gear mechanism is known as a Ravineaux planetary gear train. This composite planetary gear mechanism has four elements and two degrees of freedom. That is, if the rotation speeds of any two elements are determined, the rotation speeds of the remaining two elements are determined.

If the input from the engine and the output to the output shaft are assigned to any two of the four elements and if the motor-generators are connected to the remaining two elements, there are many combinations of the speeds of the two motor-generators which achieves a certain speed ratio between the input rotation speed and output rotation speed. From these combinations, therefore, there can be selected the combination which can minimize the power supported by the motor-generators.

Especially in the present invention, an input In from the engine and an output Out to the output shaft are assigned to the two elements on the inner side in the alignment chart of FIG. 26D, and motor-generators MGi and MGo are individually connected to the two elements on the outer sides. Therefore, the torque supported by the motor-generator with respect to the engine output, that is, the energy passing through the motor-generators can be lower and consequently improves the transmission efficiency of drivetrain.

Figure 27:
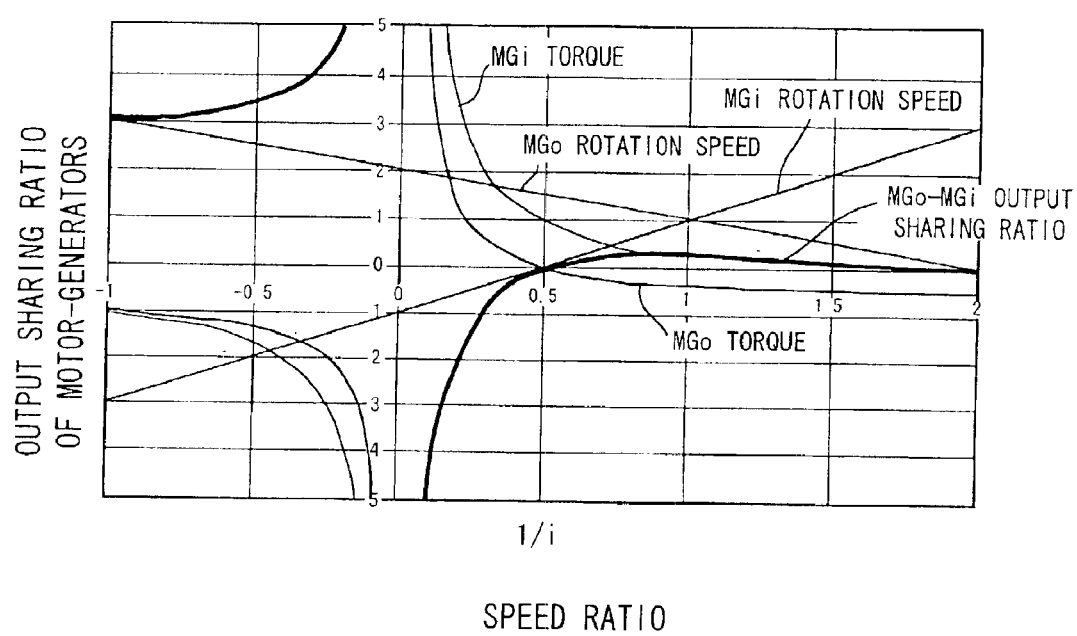
FIG. 27 is a characteristic diagram illustrating the relation between the output sharing ratio of motor-generators and the speed ratio.

FIG. 27 illustrates relations between the speed ratio between the engine and the output shaft and the ratio of the output (as will be called the "output sharing ratio") passing through the motor-generators MGi and MGo to the engine output under the balanced condition of the input/output between the motor-generators MGi and MGo. In the region of a speed ratio of 0.4 to 2.0 (or a reduction ratio of 2.5 to 0.5), as illustrated, the output sharing ratio of the motor-generators MGi and MGo is suppressed within about 30% of the output generated by the engine.

Figure 28:
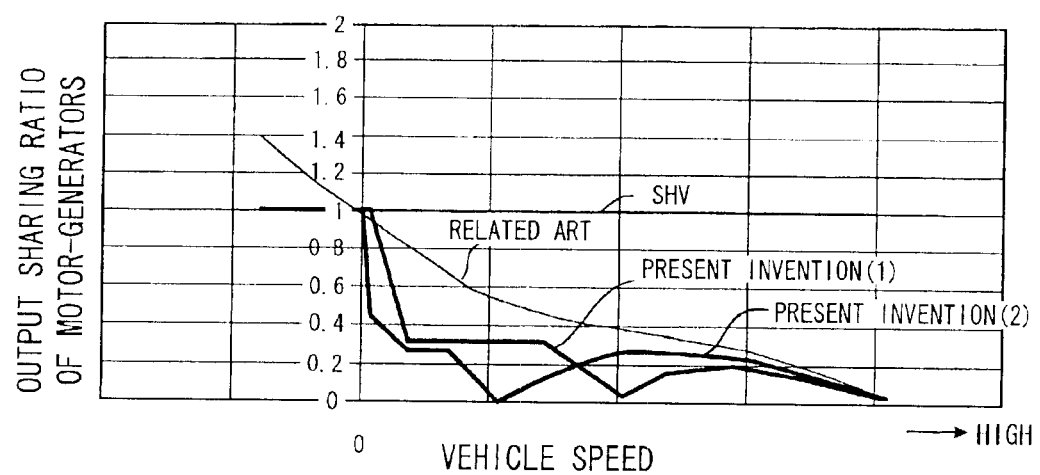
FIG. 28 is a characteristic diagram illustrating the relation between the output sharing ratio of the motor-generators and the vehicle speed.

FIG. 28 illustrates relations between the output sharing ratio of the motor generators and the vehicle speed of the case where the aforementioned construction is applied to the hybrid vehicle. The "PRESENT INVENTION (1)" and the "PRESENT INVENTION (2)" in FIG. 28 are different from each other only in the settings of the final reduction ratio of the vehicle, and the drive can be made in most vehicle speed ranges in either case at the output sharing ratio of 30% or less of the motor-generators.

From these figures, according to the present invention, it is found that motor-generators of a lower output can be applied and a higher transmission efficiency can be achieved than the related art where the present invention is not applied. The letters SHV in FIG. 28 designate the case of a series hybrid vehicle, which is always given an output sharing ratio of 1 because the engine output is wholly used for driving the generator.

In the drivetrain according to the present invention, the output share of the motor-generators can be decreased by setting the motor-generators at as a high rotation speed as possible (i.e., by enlarging the length between the motor-generators and the input/output on the alignment chart), and the efficiency can be enhanced by rotating the motor-generator closer to the element connected to the output shaft, at a high speed.

Moreover, the two motor-generators can be downsized by arranging the inner and outer rotors coaxially, and the output share of the motor-generator can be optimized by setting the inner rotor to rotate at a higher speed. Moreover, the motor-generators having the inner and outer rotors are arranged between the planetary gear mechanism and the engine, and the outer rotor shaft of the motor-generator is folded back on the engine side and is connected to one element of the planetary gear mechanism through a hollow inner rotor shaft. With this construction, therefore, the motor-generators can be arranged at a position closer to the engine thereby to decrease vibrations.

The engine, the motor-generators and the planetary gear mechanism can be coaxially arranged. The drive shaft arranged in parallel with the planetary gear mechanism can be connected through the reduction mechanism to construct a compact drivetrain suitable Each elements of the planetary gear mechanism composing the differential mechanism according to the present invention can be constructed such that the engine or the output shaft is connected to them either directly or through a rotation transmitting mechanism such as a reduction gear or clutch.

Since the reverse torque may be inputted to the engine in a certain running state of the two motor-generators. It is, therefore, desirable that the engine is provided with a reverse rotation preventing mechanism such as a one-way clutch.

The entire contents of Japanese Patent Application P2001-221222 (filed Jul. 23, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A drivetrain for transmitting driving force from an engine to a drive shaft of a vehicle, comprising:
   a composite planetary gear mechanism including first to fourth rotational elements arrayed on an alignment chart, the first rotational element being connected to an output shaft of the engine and the second rotational element being connected to the drive shaft,
   a first motor-generator connected to the third rotational element,
   a second motor-generator connected to the fourth rotational element, the second motor-generator being arranged coaxially with the first motor-generator, and
   a clutch interposed between the output shaft of the engine and the first rotational element,
   wherein the first and second rotational element are positioned between the third and fourth rotational elements on the alignment chart and mechanical connections between the output shaft of the engine and the rotational elements of the composite planetary gear mechanism are all interrupted when the clutch is disengaged.

2. A drivetrain according to claim 1, wherein:
   the first motor-generator is constructed by a stator and a rotor arranged inside the stator, and
   the second motor-generator is constructed by the stator and a rotor arranged outside the stator.

3. A drivetrain according to claim 2, wherein a rotation speed of the first motor-generator is higher than a rotation speed of the second motor-generator.

4. A drivetrain according to claim 2, wherein:
   the planetary gear mechanism is arranged between the engine and the two motor-generators, and
   a rotor shaft of the first motor-generator is arranged through a hollow rotor shaft of the second motor-generator.

5. A drivetrain according to claim 2, wherein:
   the planetary gear mechanism is arranged between the engine and the two motor-generators, and
   a rotor shaft of the second motor-generator is arranged through a hollow rotor shaft of the first motor-generator.

6. A drivetrain according to claim 2, wherein:
   the two motor-generators are arranged between the engine and the planetary gear mechanism, and
   a rotor shaft of the second motor-generator is arranged through a hollow rotor shaft of the first motor-generator.

7. A drivetrain according to claim 6, wherein:
   the rotor shaft of the second motor-generator is hollow, and
   the output shaft of the engine is arranged through the hollow rotation shaft of the second motor-generator.

8. A drivetrain for transmitting driving force from an engine to a drive shaft of a vehicle, comprising:
   a composite planetary gear mechanism including first to fourth rotational element second rotational element arrayed on an alignment chart, the first rotational element being connected to an output shaft of the engine and the second rotational element being connected to the drive shaft,
   a first motor-generator connected to the third rotational element, a second motor-generator connected to the fourth rotational element, the second motor-generator being arranged coaxially with the first motor-generator, and a clutch interposed between the output shaft of the engine and the first rotational element, wherein:

a distance on the alignment chart between the second rotational element and the third rotational element is shorter than a distance on the alignment chart between the second rotational element and the fourth rotational element, a rotation speed of the first motor-generator is higher than a rotation speed of the second motor-generator, and mechanical connections between the output shaft of the engine and the rotational elements of the composite planetary gear mechanism are all interrupted when the clutch is disengaged.

9. A drivetrain according to claim 1, further comprising a reverse rotational preventing mechanism for preventing the first rotational element from rotating in reverse direction.

10. A drivetrain for transmitting driving force from an engine to a drive shaft of a vehicle, comprising:

a composite planetary gear mechanism including first to fourth rotational elements arrayed on an alignment chart, the first rotational element being connected to an output shaft of the engine and the second rotational element being connected to the drive shaft, a first motor-generator connected to the third rotational element, a second motor-generator connected to the fourth rotational element, and a clutch interposed between the output shaft of the engine and the first rotational element, wherein the first and second rotational elements are positioned between the third and fourth rotational elements on the alignment chart and mechanical connections between the output shaft of the engine and the rotational elements of the composite planetary gear mechanism are all interrupted when the clutch is disengaged.

11. A drivetrain for transmitting driving force form an engine to a drive shaft of a vehicle, comprising:

a composite planetary gear mechanism including first to fourth rotational elements arrayed on an alignment chart, the first rotational element being connected to an output shaft of the engine and the second rotational element being connected to the drive shaft, a first motor-generator connected to the third rotational element, a second motor-generator connected to the fourth rotational element, and a clutch interposed between the output shaft of the engine and the first rotational element, wherein a distance of the alignment chart between the second rotational element and the third rotational element is shorter than a distance on the alignment chart between the second rotational element and the fourth rotational element, and wherein mechanical connections between the output shaft of the engine and the rotational elements of the composite planetary gear mechanism are all interrupted when the clutch is disengaged.

12. A drivetrain according to claim 11, wherein the first and second motor-generators are configured so that a rotation speed of the first motor-generator is higher than a rotation speed of the second motor-generator.

* * * * *